(12) United States Patent
Roessle et al.

(10) Patent No.: US 9,879,748 B2
(45) Date of Patent: Jan. 30, 2018

(54) TWO POSITION VALVE WITH FACE SEAL AND PRESSURE RELIEF PORT

(71) Applicant: Tenneco Automotive Operating Company Inc., Lake Forest, IL (US)

(72) Inventors: Matthew L. Roessle, Temperance, MI (US); Thomas P. Mallin, Temperance, MI (US); John McGahey, Trenton, MI (US); Jeffrey T. Gardner, Woodland Park, CO (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/208,410

(22) Filed: Mar. 13, 2014

(65) Prior Publication Data
US 2014/0262654 A1 Sep. 18, 2014

Related U.S. Application Data

(60) Provisional application No. 61/786,684, filed on Mar. 15, 2013.

(51) Int. Cl.
*F16F 9/36* (2006.01)
*F16F 9/46* (2006.01)
(Continued)

(52) U.S. Cl.
CPC ............. *F16F 9/369* (2013.01); *F16F 9/325* (2013.01); *F16F 9/342* (2013.01); *F16F 9/46* (2013.01); *F16F 9/464* (2013.01)

(58) Field of Classification Search
CPC ............. F16F 9/185; F16F 9/34; F16F 9/369
See application file for complete search history.

(56) References Cited

U.S. PATENT DOCUMENTS 2,409,349 A * 10/1946 Focht .................. F16F 9/34
188/315
2,473,043 A * 6/1949 Whisler, Jr. ............ F16F 9/34
137/493.8
(Continued)

FOREIGN PATENT DOCUMENTS

CN 1094855 C 11/2002
CN 1267611 C 8/2006
(Continued)

OTHER PUBLICATIONS

Search Report and Written Opinion dated Aug. 19, 2014 in corresponding PCT Application No. PCT/US2014/028136 (12 pages).

(Continued)

*Primary Examiner* — Bradley T King
(74) *Attorney, Agent, or Firm* — Harness, Dickey & Pierce, P.L.C.

(57) ABSTRACT

A shock absorber has a housing with a piston rod assembly disposed therein. A first rod guide member is secured within a first portion of the housing so as to be concentrically disposed about at least a portion of the piston rod assembly. A second rod guide member is secured within the housing adjacent the first rod guide member so as to be concentrically disposed about at least another portion of the piston rod assembly. A digital valve assembly is disposed within the second rod guide member and fluidly couples chambers within the shock absorber.

8 Claims, 14 Drawing Sheets

(51) Int. Cl.
 *F16F 9/32* (2006.01)
 *F16F 9/342* (2006.01)

(56) References Cited

U.S. PATENT DOCUMENTS

| | | | |
|---|---|---|---|
| 3,896,908 A * | 7/1975 | Petrak | B60G 17/08 |
| | | | 188/280 |
| 3,945,474 A | 3/1976 | Palmer | |
| 4,317,105 A | 2/1982 | Sinha et al. | |
| 4,352,417 A | 10/1982 | Stinson | |
| 4,468,050 A | 8/1984 | Woods et al. | |
| 4,552,324 A | 11/1985 | Hrusch | |
| 4,564,214 A | 1/1986 | Tokunaga et al. | |
| 4,589,528 A | 5/1986 | Axthammer et al. | |
| 4,591,186 A | 5/1986 | Ashiba | |
| 4,696,489 A | 9/1987 | Fujishiro et al. | |
| 4,723,640 A | 2/1988 | Beck | |
| 4,726,453 A | 2/1988 | Obstfelder et al. | |
| 4,749,070 A * | 6/1988 | Moser | F16F 9/46 |
| | | | 188/266.2 |
| 4,776,437 A | 10/1988 | Ishibashi et al. | |
| 4,788,489 A | 11/1988 | Kobayashi et al. | |
| 4,846,317 A | 7/1989 | Hudgens | |
| 4,850,460 A | 7/1989 | Knecht et al. | |
| 4,867,476 A | 9/1989 | Yamanaka et al. | |
| 4,872,537 A | 10/1989 | Warner | |
| 4,892,328 A | 1/1990 | Kurtzman et al. | |
| 4,909,536 A | 3/1990 | Hale | |
| 4,913,457 A | 4/1990 | Hafner et al. | |
| 4,943,083 A * | 7/1990 | Groves | B60G 17/015 |
| | | | 188/266.1 |
| 4,958,706 A | 9/1990 | Richardson et al. | |
| 4,969,662 A | 11/1990 | Stuart | |
| 4,973,854 A | 11/1990 | Hummel | |
| 4,984,819 A | 1/1991 | Kakizaki et al. | |
| 4,986,393 A | 1/1991 | Preukschat et al. | |
| 4,988,967 A | 1/1991 | Miller et al. | |
| 5,038,613 A | 8/1991 | Takenaka et al. | |
| 5,058,715 A | 10/1991 | Silberstein | |
| 5,067,743 A | 11/1991 | Kokubo et al. | |
| 5,092,626 A | 3/1992 | Athanas et al. | |
| 5,106,053 A | 4/1992 | Miller et al. | |
| 5,123,671 A | 6/1992 | Driessen et al. | |
| 5,133,434 A | 7/1992 | Kikushima et al. | |
| 5,133,574 A | 7/1992 | Yamaoka et al. | |
| 5,143,185 A | 9/1992 | Klein et al. | |
| 5,154,442 A | 10/1992 | Milliken | |
| 5,160,162 A | 11/1992 | Mouri et al. | |
| 5,189,614 A | 2/1993 | Mitsuoka et al. | |
| 5,200,895 A | 4/1993 | Emura et al. | |
| 5,242,190 A | 9/1993 | Morris | |
| 5,285,878 A | 2/1994 | Scheffel et al. | |
| 5,293,968 A | 3/1994 | Schuelke et al. | |
| 5,299,488 A | 4/1994 | Kadlicko et al. | |
| 5,337,863 A | 8/1994 | Lizell | |
| 5,350,187 A | 9/1994 | Shinozaki | |
| 5,350,983 A | 9/1994 | Miller et al. | |
| 5,360,089 A | 11/1994 | Nakamura et al. | |
| 5,360,230 A | 11/1994 | Yamada et al. | |
| 5,363,945 A | 11/1994 | Lizell et al. | |
| 5,383,679 A | 1/1995 | Nakamura et al. | |
| 5,390,121 A | 2/1995 | Wolfe | |
| 5,396,973 A | 3/1995 | Schwemmer et al. | |
| 5,404,973 A | 4/1995 | Katoh et al. | |
| 5,430,648 A | 7/1995 | Sasaki | |
| 5,435,421 A | 7/1995 | Beck | |
| 5,439,085 A * | 8/1995 | Woessner | F16F 9/465 |
| | | | 188/266.6 |
| 5,485,417 A | 1/1996 | Wolf et al. | |
| 5,487,455 A | 1/1996 | Feigel | |
| 5,488,556 A | 1/1996 | Sasaki | |
| 5,497,325 A | 3/1996 | Mine | |
| 5,497,862 A | 3/1996 | Hoya | |
| 5,532,921 A | 7/1996 | Katsuda | |
| 5,570,762 A | 11/1996 | Jentsch et al. | |
| 5,577,579 A | 11/1996 | Derr | |
| 5,590,898 A | 1/1997 | Williams et al. | |
| 5,597,054 A | 1/1997 | Nagai et al. | |
| 5,632,503 A | 5/1997 | Raad et al. | |
| 5,638,275 A | 6/1997 | Sasaki et al. | |
| 5,653,315 A | 8/1997 | Ekquist et al. | |
| 5,655,633 A | 8/1997 | Nakadate et al. | |
| 5,656,315 A | 8/1997 | Tucker et al. | |
| 5,657,840 A | 8/1997 | Lizell | |
| 5,690,195 A | 11/1997 | Kruckemeyer et al. | |
| 5,725,239 A | 3/1998 | de Molina | |
| 5,775,470 A | 7/1998 | Feigel | |
| 5,803,482 A | 9/1998 | Kim | |
| 5,833,036 A | 11/1998 | Gillespie | |
| 5,845,672 A | 12/1998 | Reuter et al. | |
| 5,860,497 A | 1/1999 | Takahashi | |
| 5,878,851 A | 3/1999 | Carlson et al. | |
| 5,890,081 A | 3/1999 | Sasaki | |
| 5,913,391 A | 6/1999 | Jeffries et al. | |
| 5,934,421 A | 8/1999 | Nakadate et al. | |
| 5,937,976 A | 8/1999 | Grundei | |
| 5,950,775 A | 9/1999 | Achmad | |
| 5,967,268 A | 10/1999 | de Molina et al. | |
| 5,987,369 A | 11/1999 | Kwak et al. | |
| 5,996,745 A | 12/1999 | Jones, Jr. et al. | |
| 6,003,644 A | 12/1999 | Tanaka | |
| 6,036,500 A | 3/2000 | Francis et al. | |
| 6,092,011 A | 7/2000 | Hiramoto | |
| 6,095,489 A | 8/2000 | Kaneko et al. | |
| 6,105,740 A | 8/2000 | Marzocchi et al. | |
| 6,109,400 A | 8/2000 | Ayyildiz et al. | |
| 6,135,250 A | 10/2000 | Forster et al. | |
| 6,155,391 A | 12/2000 | Kashiwagi et al. | |
| 6,213,262 B1 | 4/2001 | Bell | |
| 6,273,224 B1 | 8/2001 | Achmad | |
| 6,296,091 B1 | 10/2001 | Hamilton | |
| 6,298,958 B1 | 10/2001 | Hwang | |
| 6,302,248 B1 | 10/2001 | Nakadate | |
| 6,321,888 B1 | 11/2001 | Reybrouck et al. | |
| 6,343,677 B2 | 2/2002 | Bell | |
| 6,427,986 B1 | 8/2002 | Sakai et al. | |
| 6,460,664 B1 | 10/2002 | Steed et al. | |
| 6,464,053 B1 | 10/2002 | Hoebrechts | |
| 6,496,761 B1 | 12/2002 | Ulyanov et al. | |
| 6,533,294 B1 | 3/2003 | Germain et al. | |
| 6,588,726 B2 | 7/2003 | Osterhart et al. | |
| 6,616,124 B2 | 9/2003 | Oliver et al. | |
| 6,651,787 B2 | 11/2003 | Grundei | |
| 6,655,512 B2 | 12/2003 | Moradmand et al. | |
| 6,672,436 B1 | 1/2004 | Keil et al. | |
| 6,707,290 B2 | 3/2004 | Nyce et al. | |
| 6,708,803 B2 | 3/2004 | Jensen | |
| 6,782,980 B2 | 8/2004 | Nakadate | |
| 6,814,193 B2 | 11/2004 | Grundei | |
| 6,851,528 B2 | 2/2005 | Lemieux | |
| 6,879,898 B2 | 4/2005 | Ghoneim et al. | |
| 6,904,344 B2 | 6/2005 | LaPlante et al. | |
| 6,959,797 B2 | 11/2005 | Mintgen et al. | |
| 6,964,325 B2 | 11/2005 | Maes | |
| 6,978,872 B2 | 12/2005 | Turner | |
| 7,032,912 B2 | 4/2006 | Nicot et al. | |
| 7,168,709 B2 | 1/2007 | Niwa et al. | |
| 7,214,103 B2 | 5/2007 | Kim et al. | |
| 7,234,574 B2 | 6/2007 | Matsunaga et al. | |
| 7,234,707 B2 | 6/2007 | Green et al. | |
| 7,273,138 B2 | 9/2007 | Park | |
| 7,286,919 B2 | 10/2007 | Nordgren et al. | |
| 7,318,595 B2 | 1/2008 | Lamela et al. | |
| 7,347,307 B2 | 3/2008 | Joly | |
| 7,374,028 B2 | 5/2008 | Fox | |
| 7,389,994 B2 | 6/2008 | Trudeau et al. | |
| 7,413,062 B2 | 8/2008 | Vandewal | |
| 7,416,189 B2 | 8/2008 | Wilde et al. | |
| 7,475,538 B2 | 1/2009 | Bishop | |
| 7,493,995 B2 | 2/2009 | Sas et al. | |
| 7,604,101 B2 | 10/2009 | Park | |
| 7,611,000 B2 | 11/2009 | Naito | |
| 7,621,538 B2 | 11/2009 | Nordmeyer et al. | |
| 7,628,253 B2 | 12/2009 | Jin et al. | |

(56) References Cited

U.S. PATENT DOCUMENTS

| | | | |
|---|---|---|---|
| 7,644,933 B2 | 1/2010 | Brookes et al. | |
| 7,654,369 B2 | 2/2010 | Murray et al. | |
| 7,654,370 B2 | 2/2010 | Cubalchini, Jr. | |
| 7,680,573 B2 | 3/2010 | Ogawa | |
| 7,722,405 B2 | 5/2010 | Jaklin et al. | |
| 7,743,896 B2 | 6/2010 | Vanhees et al. | |
| 7,770,983 B2 | 8/2010 | Park | |
| 7,775,333 B2 | 8/2010 | Or et al. | |
| 7,849,983 B2 | 12/2010 | St. Clair et al. | |
| 7,878,311 B2 * | 2/2011 | Van Weelden | F16F 9/465 137/487.5 |
| 7,896,311 B2 | 3/2011 | Jee | |
| 7,912,603 B2 | 3/2011 | Stiller et al. | |
| 7,926,513 B2 | 4/2011 | Ishibashi et al. | |
| 7,931,282 B2 | 4/2011 | Kolp et al. | |
| 7,942,248 B2 | 5/2011 | St. Clair et al. | |
| 7,946,163 B2 | 5/2011 | Gartner | |
| 7,946,399 B2 | 5/2011 | Masamura | |
| 7,967,116 B2 | 6/2011 | Boerschig | |
| 7,967,117 B2 | 6/2011 | Abe | |
| 7,992,692 B2 | 8/2011 | Lee et al. | |
| 7,997,394 B2 | 8/2011 | Yamaguchi | |
| 8,056,392 B2 | 11/2011 | Ryan et al. | |
| 8,075,002 B1 | 12/2011 | Pionke et al. | |
| 8,113,521 B2 | 2/2012 | Lin et al. | |
| 8,116,939 B2 | 2/2012 | Kajino et al. | |
| 8,132,654 B2 | 3/2012 | Widla et al. | |
| 8,136,644 B2 | 3/2012 | Sonsterod | |
| 8,160,774 B2 | 4/2012 | Li et al. | |
| 8,214,106 B2 | 7/2012 | Ghoneim et al. | |
| 8,267,382 B2 | 9/2012 | Yazaki et al. | |
| 8,275,515 B2 | 9/2012 | Wright et al. | |
| 8,317,172 B2 | 11/2012 | Quinn et al. | |
| 8,393,446 B2 | 3/2013 | Haugen | |
| 8,430,217 B2 | 4/2013 | Hennecke et al. | |
| 8,525,453 B2 | 9/2013 | Ogawa | |
| 8,567,575 B2 | 10/2013 | Jung et al. | |
| 8,616,351 B2 | 12/2013 | Roessle et al. | |
| 8,666,596 B2 | 3/2014 | Arenz | |
| 8,684,367 B2 | 4/2014 | Haugen | |
| 8,695,766 B2 | 4/2014 | Yamashita et al. | |
| 8,794,405 B2 | 8/2014 | Yamashita et al. | |
| 8,844,687 B2 | 9/2014 | Yu et al. | |
| 8,899,391 B2 | 12/2014 | Yamasaki et al. | |
| 8,948,941 B2 | 2/2015 | Ogawa | |
| 9,027,937 B2 | 5/2015 | Ryan et al. | |
| 9,150,077 B2 | 10/2015 | Roessle et al. | |
| 9,163,691 B2 * | 10/2015 | Roessle | F16F 9/185 |
| 9,188,186 B2 | 11/2015 | Hoven et al. | |
| 9,217,483 B2 | 12/2015 | Dunaway et al. | |
| 9,399,383 B2 | 7/2016 | Blankenship et al. | |
| 2002/0133277 A1 | 9/2002 | Koh | |
| 2003/0164193 A1 | 9/2003 | Lou | |
| 2003/0192755 A1 | 10/2003 | Barbison et al. | |
| 2004/0090020 A1 | 5/2004 | Braswell | |
| 2004/0154887 A1 | 8/2004 | Nehl et al. | |
| 2004/0199313 A1 | 10/2004 | Dellinger | |
| 2005/0001472 A1 | 1/2005 | Bale et al. | |
| 2005/0029063 A1 | 2/2005 | Neumann | |
| 2005/0056502 A1 | 3/2005 | Maes | |
| 2005/0056504 A1 | 3/2005 | Holiviers | |
| 2005/0061593 A1 | 3/2005 | DeGronckel et al. | |
| 2005/0085969 A1 | 4/2005 | Kim | |
| 2005/0113997 A1 | 5/2005 | Kim | |
| 2005/0173849 A1 | 8/2005 | Vandewal | |
| 2006/0038149 A1 | 2/2006 | Albert et al. | |
| 2006/0124415 A1 * | 6/2006 | Joly | F16F 9/46 188/315 |
| 2006/0219503 A1 | 10/2006 | Kim | |
| 2007/0034466 A1 | 2/2007 | Paesmans et al. | |
| 2007/0051574 A1 | 3/2007 | Keil et al. | |
| 2007/0255466 A1 | 11/2007 | Chiao | |
| 2008/0054537 A1 | 3/2008 | Harrison | |
| 2008/0243336 A1 | 10/2008 | Fitzgibbons | |
| 2008/0250844 A1 | 10/2008 | Gartner | |
| 2008/0264743 A1 | 10/2008 | Lee et al. | |
| 2008/0277218 A1 | 11/2008 | Fox | |
| 2009/0071772 A1 | 3/2009 | Cho et al. | |
| 2009/0078517 A1 | 3/2009 | Maneyama et al. | |
| 2009/0084647 A1 | 4/2009 | Maneyama et al. | |
| 2009/0132122 A1 | 5/2009 | Kim et al. | |
| 2009/0192673 A1 | 7/2009 | Song et al. | |
| 2009/0200125 A1 | 8/2009 | Sonsterod | |
| 2009/0200503 A1 | 8/2009 | Park | |
| 2010/0001217 A1 | 1/2010 | Jee et al. | |
| 2010/0044172 A1 | 2/2010 | Jee et al. | |
| 2010/0066051 A1 | 3/2010 | Haugen | |
| 2010/0109276 A1 | 5/2010 | Marjoram et al. | |
| 2010/0138116 A1 | 6/2010 | Coombs | |
| 2010/0163354 A1 | 7/2010 | Braun | |
| 2010/0181154 A1 | 7/2010 | Panichgasem | |
| 2010/0191420 A1 | 7/2010 | Honma et al. | |
| 2010/0211253 A1 | 8/2010 | Morais Dos Santos et al. | |
| 2010/0276906 A1 | 11/2010 | Galasso et al. | |
| 2010/0301578 A1 | 12/2010 | Noda et al. | |
| 2010/0326267 A1 | 12/2010 | Hata | |
| 2011/0035091 A1 | 2/2011 | Yamamoto | |
| 2011/0056780 A1 | 3/2011 | St.Clair et al. | |
| 2011/0056783 A1 | 3/2011 | Teraoka et al. | |
| 2011/0079475 A1 * | 4/2011 | Roessle | F16F 9/348 188/266.5 |
| 2011/0101579 A1 | 5/2011 | Polakowski et al. | |
| 2011/0153157 A1 | 6/2011 | Klank et al. | |
| 2011/0198172 A1 | 8/2011 | Whan | |
| 2011/0214956 A1 | 9/2011 | Marking | |
| 2011/0240424 A1 | 10/2011 | Beck | |
| 2011/0298399 A1 | 12/2011 | Ogawa et al. | |
| 2012/0018263 A1 | 1/2012 | Marking | |
| 2012/0048665 A1 | 3/2012 | Marking | |
| 2012/0073918 A1 | 3/2012 | Nishimura et al. | |
| 2012/0073920 A1 | 3/2012 | Yamasaki et al. | |
| 2012/0181126 A1 | 7/2012 | De Kock | |
| 2012/0186922 A1 | 7/2012 | Battlogg et al. | |
| 2012/0228072 A1 | 9/2012 | Mangelschots et al. | |
| 2012/0305349 A1 | 12/2012 | Murakami et al. | |
| 2013/0081913 A1 | 4/2013 | Nowaczyk et al. | |
| 2013/0090808 A1 | 4/2013 | Lemme et al. | |
| 2013/0228401 A1 | 9/2013 | Bender et al. | |
| 2013/0234379 A1 | 9/2013 | Panichgasem | |
| 2013/0263943 A1 | 10/2013 | Forster | |
| 2013/0275003 A1 | 10/2013 | Uchino et al. | |
| 2013/0299291 A1 | 11/2013 | Ewers et al. | |
| 2013/0313057 A1 | 11/2013 | Tsukahara et al. | |
| 2013/0328277 A1 | 12/2013 | Ryan et al. | |
| 2013/0340865 A1 | 12/2013 | Manger et al. | |
| 2013/0341140 A1 | 12/2013 | Nakajima | |
| 2013/0341842 A1 | 12/2013 | Weber | |
| 2013/0345933 A1 | 12/2013 | Norton et al. | |
| 2014/0102842 A1 | 4/2014 | Roessle et al. | |
| 2014/0125018 A1 | 5/2014 | Brady et al. | |
| 2014/0202808 A1 | 7/2014 | Spyche, Jr. et al. | |
| 2014/0216871 A1 | 8/2014 | Shibahara | |
| 2014/0231200 A1 | 8/2014 | Katayama | |
| 2014/0238797 A1 | 8/2014 | Blankenship et al. | |
| 2014/0239602 A1 | 8/2014 | Blankenship et al. | |
| 2014/0244112 A1 | 8/2014 | Dunaway et al. | |
| 2014/0260233 A1 | 9/2014 | Giovanardi et al. | |
| 2014/0262648 A1 * | 9/2014 | Roessle | F16F 9/34 188/282.2 |
| 2014/0262652 A1 | 9/2014 | Roessle et al. | |
| 2014/0262654 A1 | 9/2014 | Roessle et al. | |
| 2014/0265169 A1 | 9/2014 | Giovanardi et al. | |
| 2014/0265170 A1 | 9/2014 | Giovanardi et al. | |
| 2014/0284156 A1 | 9/2014 | Kim | |
| 2014/0291090 A1 | 10/2014 | Shimasaki | |
| 2014/0297116 A1 | 10/2014 | Anderson et al. | |
| 2014/0297117 A1 | 10/2014 | Near et al. | |
| 2014/0303844 A1 | 10/2014 | Hoffmann et al. | |
| 2015/0088379 A1 | 3/2015 | Hirao | |

FOREIGN PATENT DOCUMENTS

| | | |
|---|---|---|
| CN | 101025213 A | 8/2007 |
| CN | 100381728 C | 4/2008 |

(56) References Cited

FOREIGN PATENT DOCUMENTS

| | | | |
|---|---|---|---|
| CN | 101229765 A | 7/2008 | |
| CN | 101509535 A | 8/2009 | |
| CN | 201575099 U | 9/2010 | |
| CN | 201575100 U | 9/2010 | |
| CN | 101857035 A | 10/2010 | |
| CN | 201636258 U | 11/2010 | |
| CN | 201705852 U | 1/2011 | |
| CN | 102032306 A | 4/2011 | |
| CN | 102076988 A | 5/2011 | |
| CN | 102109024 A | 6/2011 | |
| CN | 102345700 A | 2/2012 | |
| CN | 103154562 A | 6/2013 | |
| CN | 103168183 A | 6/2013 | |
| CN | 103244495 A | 8/2013 | |
| CN | 203186023 U | 9/2013 | |
| CN | 103429929 A | 12/2013 | |
| CN | 103702888 A | 4/2014 | |
| CN | 203548687 U | 4/2014 | |
| CN | 103946095 A | 7/2014 | |
| CN | 104074909 A | 10/2014 | |
| DE | 3406875 A1 | 9/1985 | |
| DE | 3518858 A1 | 11/1985 | |
| DE | 3432465 A1 | 3/1986 | |
| DE | 3518327 A1 | 11/1986 | |
| DE | 3928343 A1 | 2/1991 | |
| DE | 4041619 A1 * | 6/1992 | F16F 9/34 |
| DE | 19853277 C1 | 5/2000 | |
| DE | 10025399 A1 | 12/2000 | |
| DE | 10238657 A1 | 3/2004 | |
| DE | 112007002377 T5 | 8/2009 | |
| EP | 1588072 A1 | 10/2005 | |
| EP | 1 746 302 | 1/2007 | |
| EP | 2105330 A1 | 9/2009 | |
| GB | 2 123 922 | 2/1984 | |
| GB | 2154700 A | 9/1985 | |
| JP | S60138044 U | 9/1985 | |
| JP | 61125907 | 6/1986 | |
| JP | S61266842 | 11/1986 | |
| JP | 62-253506 | 11/1987 | |
| JP | S6467408 A | 3/1989 | |
| JP | H0550827 A | 3/1993 | |
| JP | 06-026546 | 2/1994 | |
| JP | 07-113434 | 5/1995 | |
| JP | 7056311 | 6/1995 | |
| JP | H0899514 A | 4/1996 | |
| JP | 08-260747 | 10/1996 | |
| JP | 09-217779 | 8/1997 | |
| JP | 200267650 A | 3/2002 | |
| JP | 2002-349630 | 12/2002 | |
| JP | 2008106783 A | 5/2008 | |
| JP | 2009002360 A | 1/2009 | |
| JP | 201198683 A | 5/2011 | |
| JP | 2011236937 A | 11/2011 | |
| WO | 9218788 A1 | 10/1992 | |
| WO | 2010029133 A1 | 3/2010 | |

OTHER PUBLICATIONS

Office Action from German Patent Office for corresponding German Application No. 11 2010 003 954.2 dated Dec. 9, 2015, 19 pages.
Search Report and Written Opinion dated Jun. 20, 2014 in corresponding PCT Application No. PCT/US2014/019534 (12pp).
Chinese Office Action for corresponding Chinese Patent Application No. 201410208616.8 dated Apr. 15, 2016, 15 pages.
Search Report and Written Opinion dated Jun. 19, 2014 in corresponding PCT Application No. PCT/US2014/019400 (12 pages).
International Search Report and Written Opinion dated Sep. 21, 2015 in corresponding PCT Application No. PCT/US2015/035568 (9 pages).

* cited by examiner

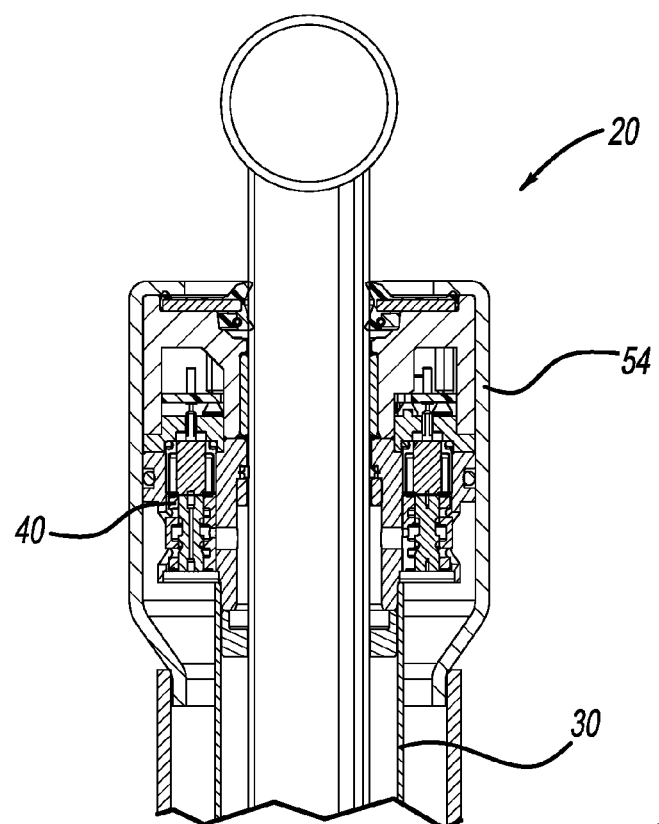
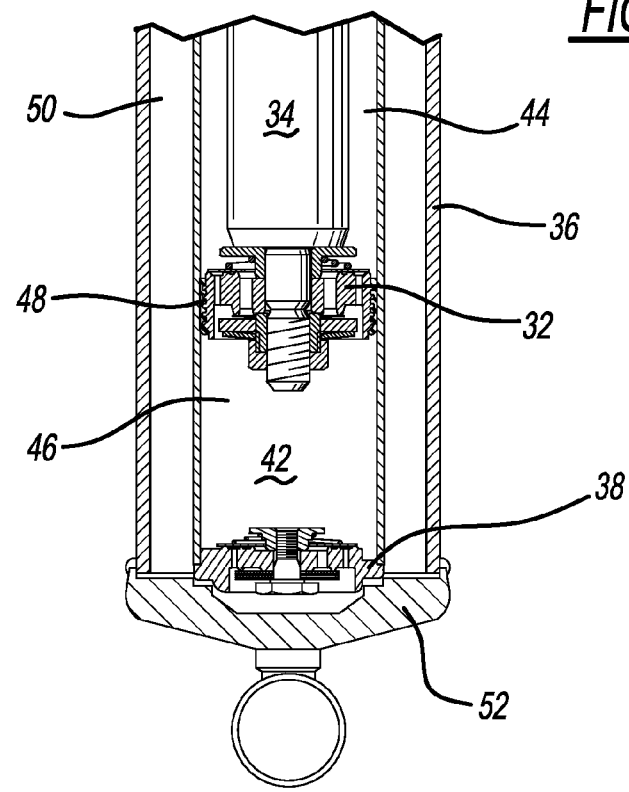
FIG - 2

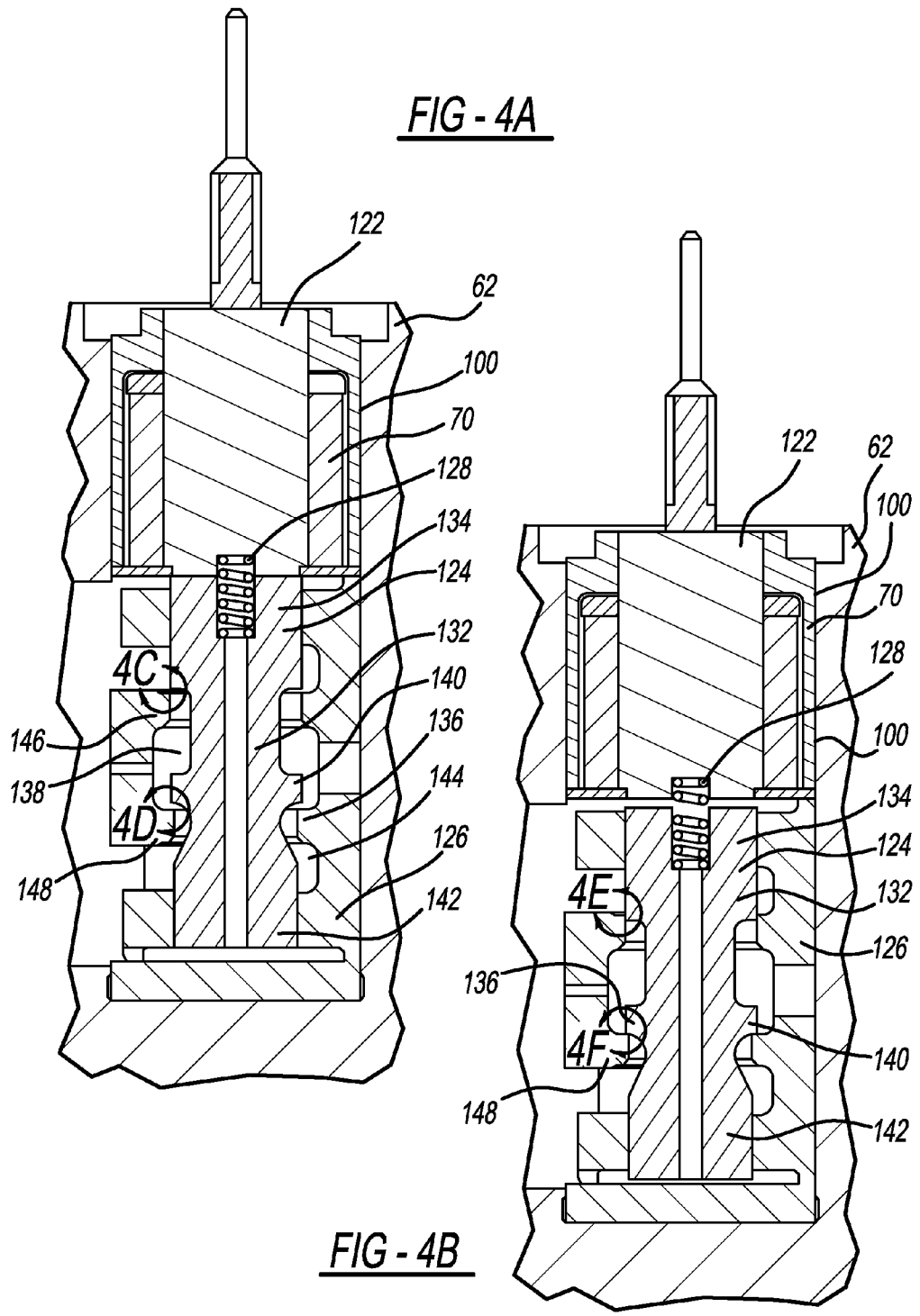

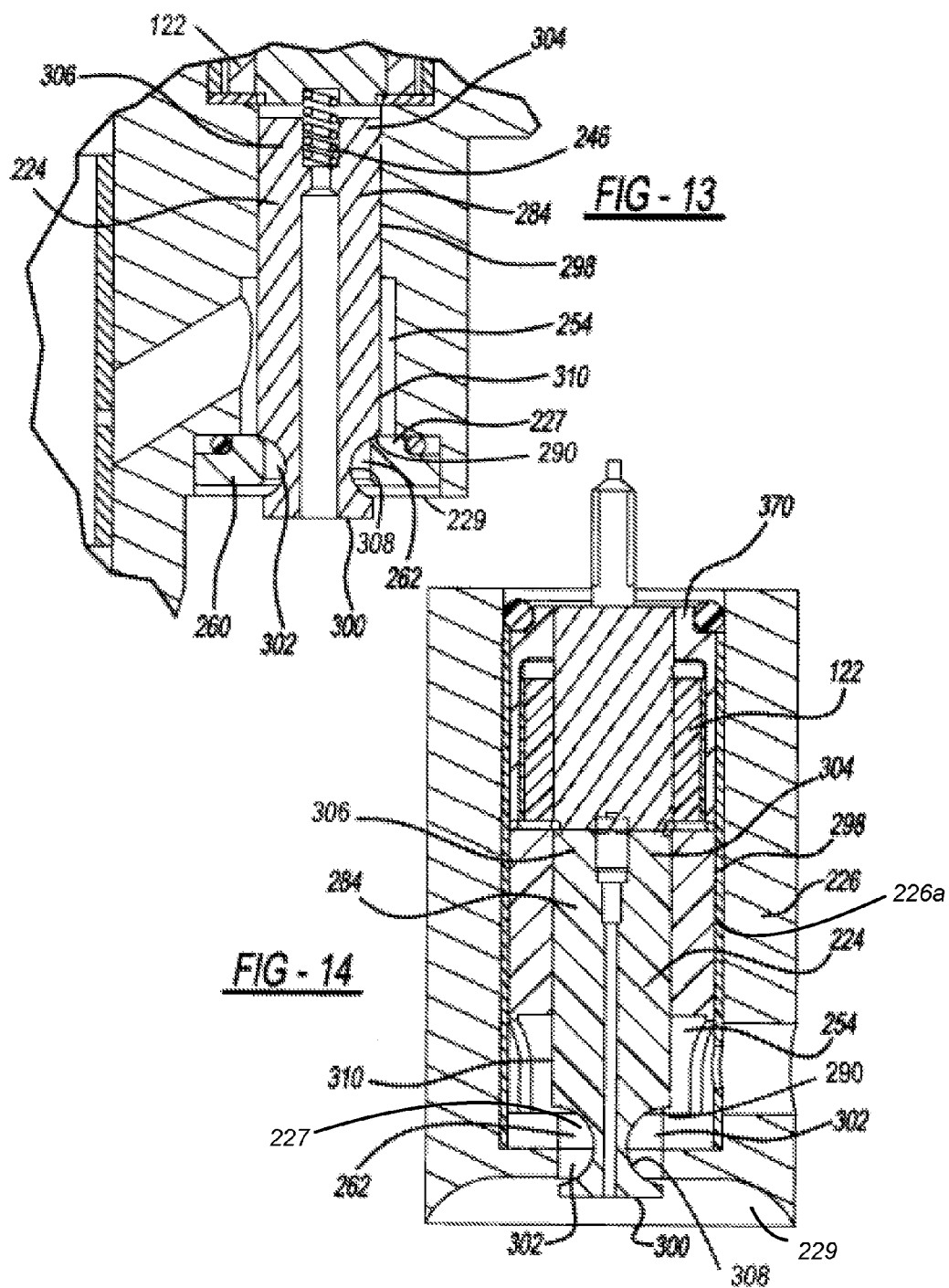

TWO POSITION VALVE WITH FACE SEAL AND PRESSURE RELIEF PORT

CROSS-REFERENCE TO RELATED APPLICATIONS

This application claims the benefit of U.S. Provisional Application No. 61/786,684, filed on Mar. 15, 2013. The entire disclosure of the above application is incorporated herein by reference.

FIELD

The present disclosure relates generally to hydraulic dampers or shock absorbers for use in a suspension system such as a suspension system used for automotive vehicles. More particularly, the present disclosure relates to an improved valve assembly for a shock absorber.

BACKGROUND

This section provides background information related to the present disclosure which is not necessarily prior art.

Shock absorbers are used in conjunction with automotive suspension systems to absorb unwanted vibrations that occur during driving. To absorb the unwanted vibrations, shock absorbers are generally connected between the sprung portion (body) and the unsprung portion (suspension) of the automobile. A piston is located within a pressure tube of the shock absorber and the pressure tube is connected to the unsprung portion of the vehicle. The piston is connected to the sprung portion of the automobile through a piston rod which extends through the pressure tube. The piston divides the pressure tube into an upper working chamber and a lower working chamber, both of which are filled with hydraulic fluid. Because the piston, through valving, is able to limit the flow of the hydraulic fluid between the upper and the lower working chambers when the shock absorber is compressed or extended, the shock absorber is able to produce a damping force which counteracts the vibration which would otherwise be transmitted from the unsprung portion to the sprung portion of the vehicle. In a dual-tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion of the vehicle to the sprung portion of the automobile.

As described above, for a dual-tube shock absorber, the valving on the piston limits the flow of damping fluid between the upper and lower working chambers when the shock absorber is extended to produce a damping load. The valving on the base valve limits the flow of damping fluid between the lower working chamber and the reserve chamber when the shock absorber is compressed to produce a damping load. For a mono-tube shock absorber, the valving on the piston limits the flow of damping fluid between the upper and lower working chambers when the shock absorber is extended or compressed to produce a damping load. During driving, the suspension system moves in jounce (compression) and rebound (extension). During jounce movements, the shock absorber is compressed, causing damping fluid to move through the base valve in a dual-tube shock absorber or through the piston valve in a mono-tube shock absorber. A damping valve located on the base valve or the piston controls the flow of damping fluid and, thus, controls the damping force created. During rebound movements, the shock absorber is extended causing damping fluid to move through the piston in both the dual-tube shock absorber and the mono-tube shock absorber. Again, a damping valve located on the piston controls the flow of damping fluid and, thus, controls damping force created.

In a dual-tube shock absorber, the piston and the base valve normally include a plurality of compression passages and a plurality of extension passages. During jounce or compression movements in a dual-tube shock absorber, the damping valve or the base valve opens the compression passages in the base valve to control fluid flow and produce a damping load. A check valve on the piston opens the compression passages in the piston to replace damping fluid in the upper working chamber, but this check valve does not contribute to the damping load. The damping valve on the piston closes the extension passages of the piston and a check valve on the base valve closes the extension passages of the base valve during a compression movement. During rebound or extension movements in a dual-tube shock absorber, the damping valve on the piston opens the extension passages in the piston to control fluid flow and produce a damping load. A check valve on the base valve opens the extension passages in the base valve to replace damping fluid in the lower working chamber, but this check valve does not contribute to the damping load.

In a mono-tube shock absorber, the piston normally includes a plurality of compression passages and a plurality of extension passages. The shock absorber will also include means for compensating for the rod volume flow of fluid as is well known in the art. During jounce or compression movements in a mono-tube shock absorber, the compression damping valve on the piston opens the compression passages in the piston to control fluid flow and produce a damping load. The extension damping valve on the piston closes the extension passages of the piston during a jounce movement. During rebound or extension movements in a mono-tube shock absorber, the extension damping valve on the piston opens the extension passages in the piston to control fluid flow and produce a damping load. The compression damping valve on the piston closes the compression passages of the piston during a rebound movement.

For most dampers, the damping valves are designed as a normal close/open valve. Because of this close/open design, these passive valve systems are limited in their ability to adjust the generated damping load in response to various operating conditions of the vehicle. Accordingly, some valves have been designed to include a bleed flow of damping fluid, such as in U.S. Pat. No. 8,616,351. While this type of design works effectively, it requires high precision components that are manufactured with tight tolerances.

SUMMARY

This section provides a general summary of the disclosure, and is not a comprehensive disclosure of its full scope or all of its features.

A shock absorber includes a rod guide assembly for housing at least one digital valve assembly. The digital valve assembly includes a guide member disposed in the rod guide assembly, a spool movably disposed within the guide member, and a coil assembly disposed adjacent the spool. While the disclosure illustrates the digital valve assemblies being located in the rod guide assembly, the digital valve assemblies can also be located in the piston rod and/or the base valve assembly as disclosed in U.S. Pat. No. 8,616,351, the disclosure of which is expressly incorporated herein by reference in its entirety.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a side view, partially in cross-section of a dual-tube shock absorber that incorporates the two-position valve assembly in the rod guide assembly in accordance with the present disclosure;

FIGS. 4A and 4B are enlarged views in cross-section of the two-position valve assembly in the rod guide assembly from the shock absorber illustrated in FIG. 2, the valve assembly being in open and closed positions, respectively;

FIGS. 11-14 represent enlarged views in cross-section of an alternate two-position valve assembly in a shock absorber.

Corresponding reference numerals indicate corresponding parts throughout the several views of the drawings.

DETAILED DESCRIPTION

Figure 1:
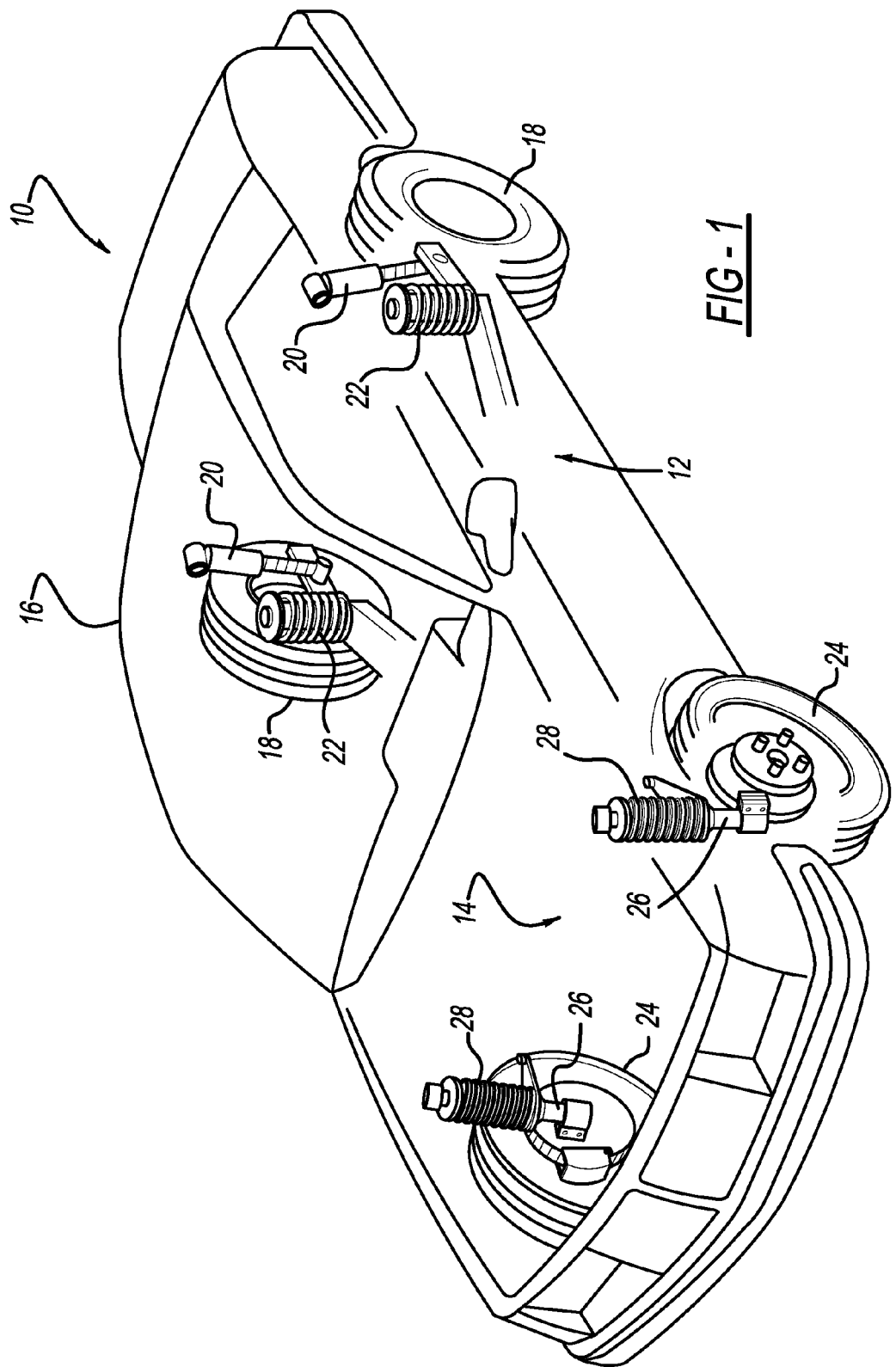
FIG. 1 is an illustration of an automobile having shock absorbers which incorporate a two-position valve assembly within a rod guide assembly in accordance with the present disclosure.

The following description is merely exemplary in nature and is not intended to limit the present disclosure, application, or uses. There is shown in FIG. 1 a vehicle incorporating a suspension system having shock absorbers in accordance with the present teachings, and which is designated generally by the reference numeral 10. Vehicle 10 has been depicted as a passenger car having front and rear axle assemblies. However, shock absorbers in accordance with the present teachings may be used with other types of vehicles or in other types of applications. Examples of these alternate arrangements include, but are not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Vehicle 10 includes a rear suspension 12, a front suspension 14, and a body 16. Rear suspension 12 has a transversely extending rear axle assembly (not shown) adapted to operatively support a pair of rear wheels 18. The rear axle is attached to body 16 by means of a pair of shock absorbers 20 and by a pair of springs 22. Similarly, front suspension 14 includes a transversely extending front axle assembly (not shown) for operatively supporting a pair of front wheels 24. The front axle assembly is attached to body 16 by means of a pair of shock absorbers 26 and by a pair of springs 28. Shock absorbers 20, 26 serve to dampen the relative motion of the unsprung portion (i.e., rear and front suspensions 12, 14) with respect to the sprung portion (i.e., body 16) of vehicle 10.

Referring now to FIG. 2, shock absorber 20 is shown in greater detail. While FIG. 2 illustrates only shock absorber 20, it is to be understood that shock absorber 26 is substantially similar to shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reserve tube 36, a base valve assembly 38, and a rod guide assembly 40.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces. Seal 48 also works to seal upper working chamber 44 from lower working chamber 46. Piston rod 34 is attached to piston assembly 32 and extends through upper working chamber 44 and through rod guide assembly 40. The end of piston rod 34 opposite to piston assembly 32 is adapted to be secured to the sprung mass of vehicle 10. Valving within piston assembly 32 controls the movement of fluid between upper working chamber 44 and lower working chamber 46 during movement of piston assembly 32 within pressure tube 30. Optionally, the digital valve assemblies described below can be positioned within the piston assembly 32, or the upper or lower rod guide assemblies 40, 64. Movement of piston assembly 32 with respect to pressure tube 30 causes a difference in the amount of fluid displaced in upper working chamber 44 and the amount of fluid displaced in lower working chamber 46. This is primarily because piston rod 34 extends only through upper working chamber 44 and not through lower working chamber 46. The difference in the amount of fluid displaced is known as the "rod volume", which flows through base valve assembly 38. It should be understood, the base value assembly 38 can have any of the valves described below.

Reserve tube 36 surrounds pressure tube 30 to define a fluid reservoir chamber 50 located between tubes 30, 36. The bottom end of reserve tube 36 is closed by a base cup 52 which is adapted to be connected to the unsprung mass of vehicle 10. The upper end of reserve tube 36 may extend about rod guide assembly 40 or may be closed by an upper can 54, which in turn, is rolled-over rod guide assembly 40, as shown. Base valve assembly 38 is disposed between lower working chamber 46 and reservoir chamber 50 to control the flow of fluid between chambers 46, 50. When shock absorber 20 extends in length (i.e., when piston rod 34 moves upwardly and outwardly of upper can 54), an additional volume of fluid is needed in lower working chamber 46 due to the "rod volume" concept. Thus, fluid will flow from reservoir chamber 50 to lower working chamber 46 through base valve assembly 38. Conversely, when shock absorber 20 compresses in length (i.e., when piston rod 34 moves towards base valve assembly 38), an excess of fluid must be removed from lower working chamber 46 due to the "rod volume" concept. Thus, fluid will flow from lower working chamber 46 to reservoir chamber 50 through base valve assembly 38.

Figure 3:
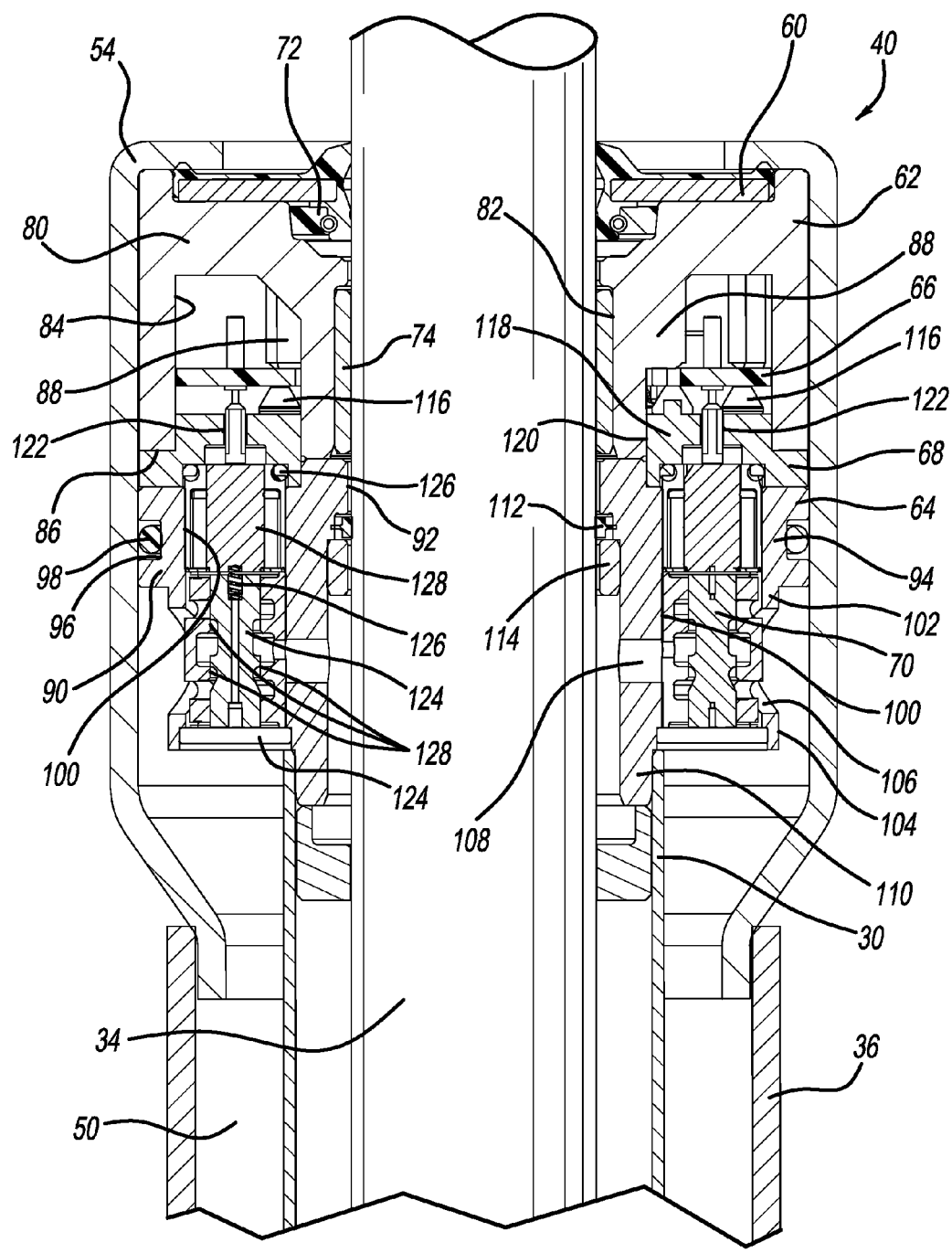
FIG. 3 is an enlarged side view, partially in cross-section of the rod guide assembly from the shock absorber illustrated in FIG. 2.

Referring now to FIG. 3, rod guide assembly 40 is illustrated in greater detail. Rod guide assembly 40 comprises a seal assembly 60, an upper rod guide 62, a lower rod guide 64, a circuit board 66, a retaining ring 68, and at least one digital valve assembly 70. Seal assembly 60 is assembled onto upper rod guide 62 so as to interface with upper can 54 and includes a check seal 72. Check seal 72 allows fluid to flow from the interface between piston rod 34 and an upper bushing 74 to reservoir chamber 50 through various fluid passages (not shown), but prohibits backwards fluid flow from reservoir chamber 50 to the interface between piston rod 34 and upper bushing 74. In one example, upper bushing 74 may be a Teflon coated bearing for slidably retaining piston rod 34.

Upper rod guide 62 may be initially assembled into upper can 54 or may be preassembled with lower rod guide 64 before installation into upper can 54. Upper can 54 may then be assembled to reserve tube 36 with pressure tube 30 assembled onto lower rod guide 64. In particular, pressure tube 30 and reserve tube 36 may be press-fit over upper can 54 and lower rod guide 64, respectively, so as to retain rod guide assembly 40 therewith.

Upper rod guide 62 may have a substantially tubular body 80 comprising a central aperture 82 extending therethrough and a concentric channel 84 extending from a lower surface 86 thereof. Upper rod guide 62 may be manufactured from a conventional forming process such as powder metal forming, metal injection molding (MIM), or other casting/forming processing. Upper rod guide 62 may accommodate seal assembly 60 at an upper portion of central aperture 82, while bushing 74 may be assembled at a lower portion of central aperture 82. Bushing 74 may be press-fit into upper rod guide 62 about central aperture 82 to accommodate the sliding motion of piston rod 34 while also providing a sealing surface for piston rod 34. Concentric channel 84 may be sized for receipt of at least circuit board 66 and may include a plurality of standoffs 88 for retaining circuit board 66 at a predefined location within upper rod guide 62.

Body 90 may have three distinct regions having consecutively smaller outer diameters for sealing against upper can 54, allowing for improved flow characteristics, and mating with pressure tube 30. For example, an upper region 94 of body 90 may have a first outer diameter correspondingly sized with an inner diameter of upper can 54. Upper region 94 may have a groove 96 extending about first outer diameter for receipt of a sealing ring or o-ring 98. A plurality of apertures 100 may extend through body 90 at upper region 94 so as to be concentrically arranged about central aperture 92. Apertures 100 may be sized for receipt of digital valve assemblies 70. Although four (4) digital valve assemblies 70 are shown for use in rod guide assembly 40, any number of digital valve assemblies 70 may be provided. The digital valve assemblies 70 are configured to restrict fluid flow, either in liquid or gas form.

Apertures 100 may extend from upper region 94 to a central region 102 of body 90. Central region 102 may have an irregularly shaped outer surface 104, smaller in relative diameter than upper region 94. Outer surface 104 may track the location and configuration of apertures 100. Notably, outer surface 104 may be correspondingly arranged to track any selected number of digital valve assemblies 70. Central region 102 may have a plurality of openings 106 corresponding to the location of each digital valve assembly 70 for fluid communication between each digital valve assembly 70 and reservoir chamber 50. Furthermore, additional openings 108 may extend between apertures 100 and central aperture 92 in order to provide an additional fluid flow path. A lower region 110 may extend from central region 102 and may be shaped as a collar for receipt of pressure tube 30, as previously described.

Lower rod guide 64 may also have a substantially tubular body 90 comprising a central aperture 92 extending therethrough. Like upper rod guide 62, lower rod guide 64 may be manufactured from a conventional forming process, such as, powder metal forming, metal injection molding (MIM), or other casting/forming processing. Lower rod guide 64 may accommodate an upper seal ring 112 and a lower bushing 114 at central aperture 92 substantially above openings 106 so as not to interfere with flow characteristics. Seal ring 112 and bushing 114 may be press-fit into lower rod guide 64 about central aperture 92 to accommodate for the sliding motion of piston rod 34 while also providing an additional seal for piston rod 34. Seal ring 112 may be a T-seal or slip ring acting as a secondary seal by absorbing any radial clearance. Bushing 114 may behave as a collar or ledge for retaining seal ring 112 within central aperture 92. Optionally, the digital valves described herein can be placed in apertures formed in the lower guide 64.

Circuit board 66 may be disposed within channel 84 of upper rod guide 62 and may abut standoffs 88 as previously discussed. Circuit board 66 may include a plurality of isolators 116 securely retained on a surface opposite standoffs 88 for abutting retaining ring 68 and for supporting circuit board 66. Circuit board 66 may be used to provide power to actuate digital valve assemblies 70. For example, each digital valve assembly 70 may be a two position valve assembly which has a different flow area in each of the two positions, as will be described in more detail below. Each digital valve assembly 70 may have wiring connections for moving between the two positions, where the wiring connections extend to circuit board 66.

Retaining ring 68 may be arranged between upper rod guide 62 and lower rod guide 64 for retaining the various digital valve assemblies 70. For example, retaining ring 68 may be press-fit into upper rod guide 62 as shown, or may be secured to either upper or lower rod guides 62, 64, such as with an adhesive. Retaining ring 68 may have a substantially tubular body 118 comprising a central aperture 120 and a plurality of concentrically arranged apertures 121 extending therethrough. Body 118 may be arranged within channel 84 of upper rod guide 62 and/or between upper rod guide 62 and lower rod guide 64. Apertures 121 may be aligned with apertures 100 in body 90 of lower rod guide 64, so as to allow the wiring connections of the digital valve assemblies 70 to extend therethrough.

Figure 4C:
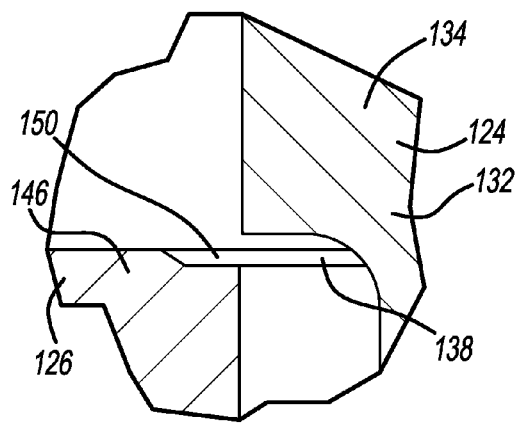
FIGS. 4C and 4D are enlarged views in cross-section of sealing surfaces of valve elements shown in FIG. 4A.
Figure 4D:
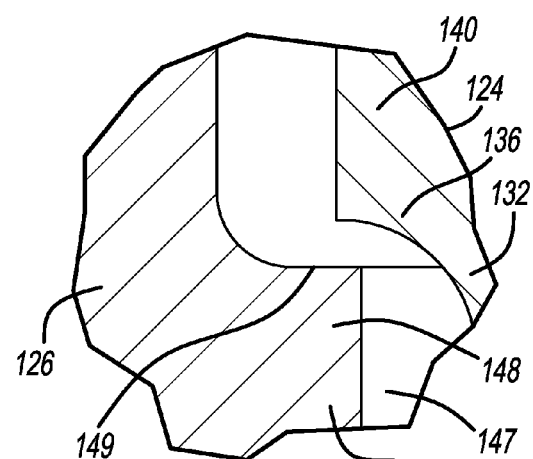
Figure 4E:
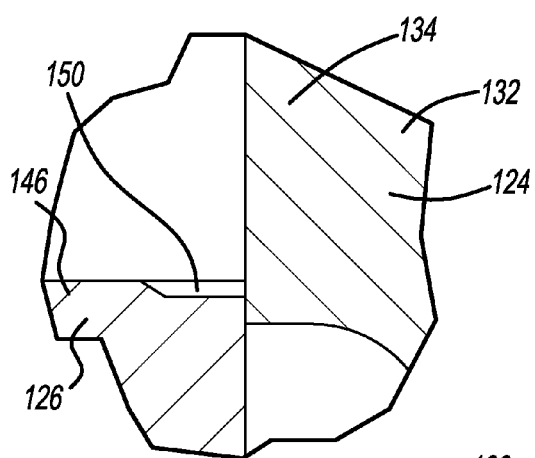
FIGS. 4E and 4F are enlarged views in cross-section of sealing surfaces of valve elements shown in FIG. 4B.
Figure 4F:
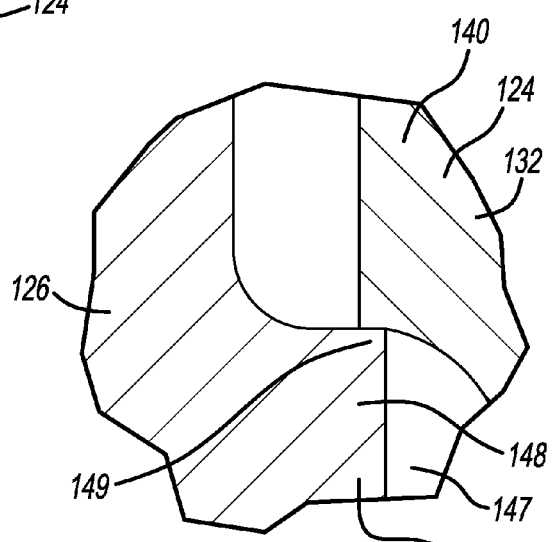

With reference now to FIGS. 3-4F, each digital valve assembly 70 may comprise a spool 124, a guide member or sleeve 126, a spring 128, and a coil assembly 122. The valve assembly 70 has an outlet coupled to either the reservoir chamber or the upper working chamber, and an input or inlet flow path coupled to the other of the upper working chamber or the reservoir chamber. Spool 124 may have a substantially tubular body 132 defining three regions having varying outer diameters. For example, a first, upper region 134 may be sized so as to be slidingly received within an upper portion of sleeve 126, which is, in turn, arranged within aperture 100 of upper rod guide 62. A second, mid region 136 may be spaced apart from upper region 134 by a radial groove 138 defined in an annular surface. Mid-region 136 may have a slightly smaller outer diameter than that of upper region 134 and may be shaped so as to define a projection 140. A third, lower region 142 may be spaced apart from mid region 136 by a second radial groove 144. Radial groove 144 may be contoured to assist in movement of the digital valve assemblies 70, as will be described in more detail below. Lower region 142 may be sized so as to be slidingly received within a lower portion of sleeve 126, which has a slightly smaller outer diameter than that of mid region 136.

Sleeve 126 may have a first protrusion 146 adjacent radial groove 138 and a second protrusion 148 corresponding to radial groove 144 of spool 124. First protrusion 146 may have an inner diameter comparably sized to that of spool 124 at upper region 134 so as to allow metered flow between spool 124 and sleeve 126 when the valve is opened. In this configuration, the valve has both a slip seal and a face seal. The upper region 134 and first protrusion 146 form a slip seal when the valve is in a closed position. Second protrusion 148, however, may have a slightly smaller inner diameter than that of spool 124 at mid region 136. In this way, second protrusion 148 restricts movement of the mid region 136 of spool 124 and sealably contacts the mid region 136 to act as a face seal for minimizing or preventing leakage.

The spring 128 may bias the spool 124 from an open position as shown in FIG. 4A and a closed position as shown in FIG. 4B. In other words, spring 128 biases spool 124 away from coil assembly 122 and towards a sealing surface arranged within aperture 100. Spool 124 axially travels within sleeve 126 so as to vary spacing between upper region 134 and first protrusion 146 (see, e.g., FIGS. 4B and 4E) and between mid-region 136 and second protrusion 148 (see, e.g., FIGS. 4C and 4F).

As best seen in FIG. 4C, the upper region 134, first protrusion 146 and radial groove 138 form a first flow passage when the digital valve assembly 70 is in its open position. Optionally, the first protrusion 146 can define a groove 150 which can function as a metering edge to restrict the flow of fluid through the first flow passage and through the digital valve assembly 70.

FIG. 4D depicts the mid-region 136 and the second protrusion 148 which together with the radial groove 147 form a second flow passage. As with the first flow passage described above, the defined surfaces of these features function as a metering construct in a second flow passage.

As shown in FIGS. 4E and 4F, when current is removed from the coil, the spool 124 is moved from the open position to the closed position due to forces induced by the spring 128. This closes the first and second flow passages. The upper region 134 is moved relative to the first protrusion 146 to form a slip seal to restrict fluid flow. Simultaneously, the second protrusion 148 engages a bearing surface 149 on the mid-region 136 to form a face seal. The engagement of the second protrusion 148 with the bearing surface 149 limits the travel of the spool 124 with respect to the sleeve 126, and positions the spacing of the first protrusion 146 and the upper region 134.

Figure 5:
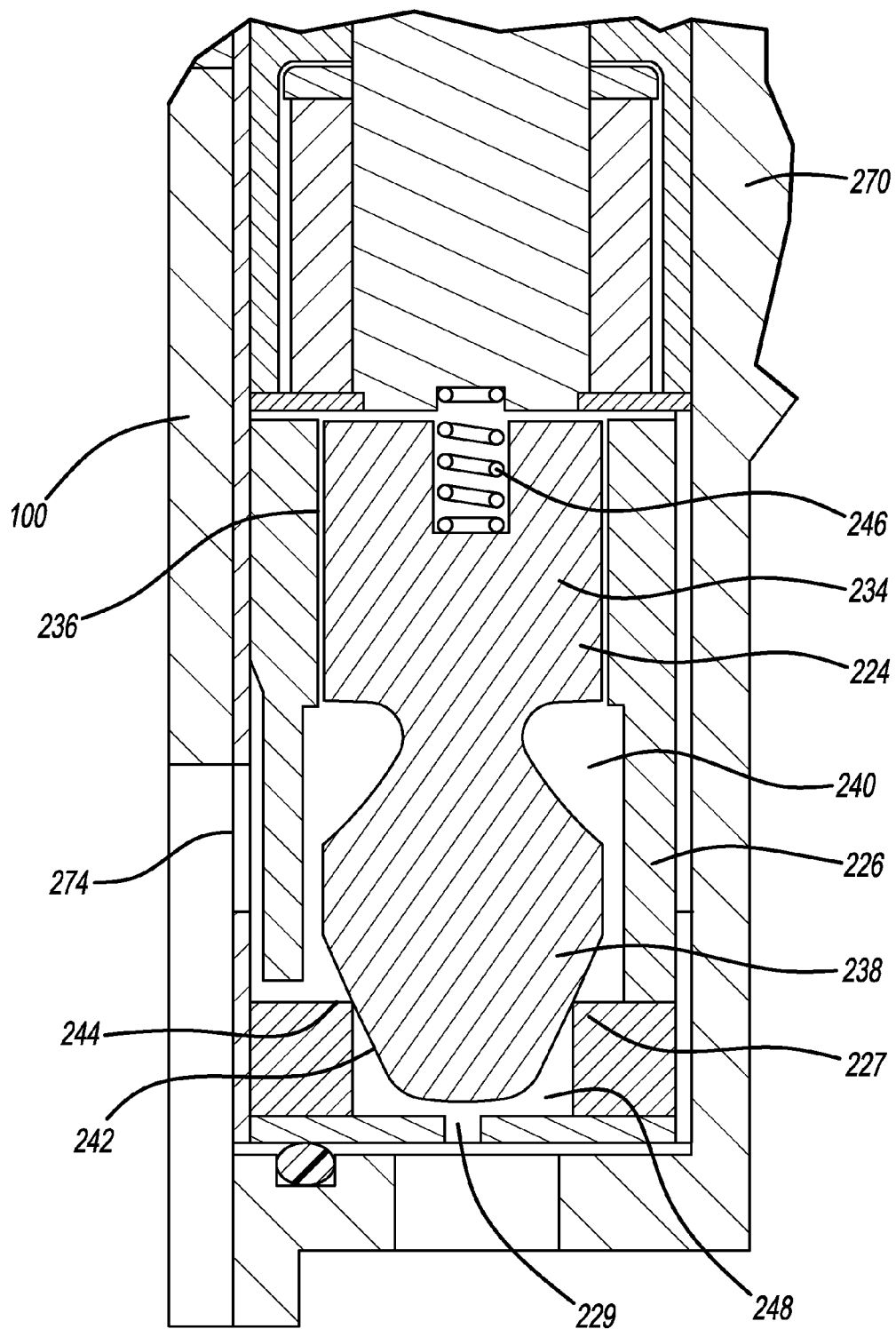
FIG. 5 is an enlarged view in cross-section of an alternate two-position valve assembly in the rod guide assembly from the shock absorber; illustrated in FIG. 2, the valve assembly being in a closed position.
Figure 6:
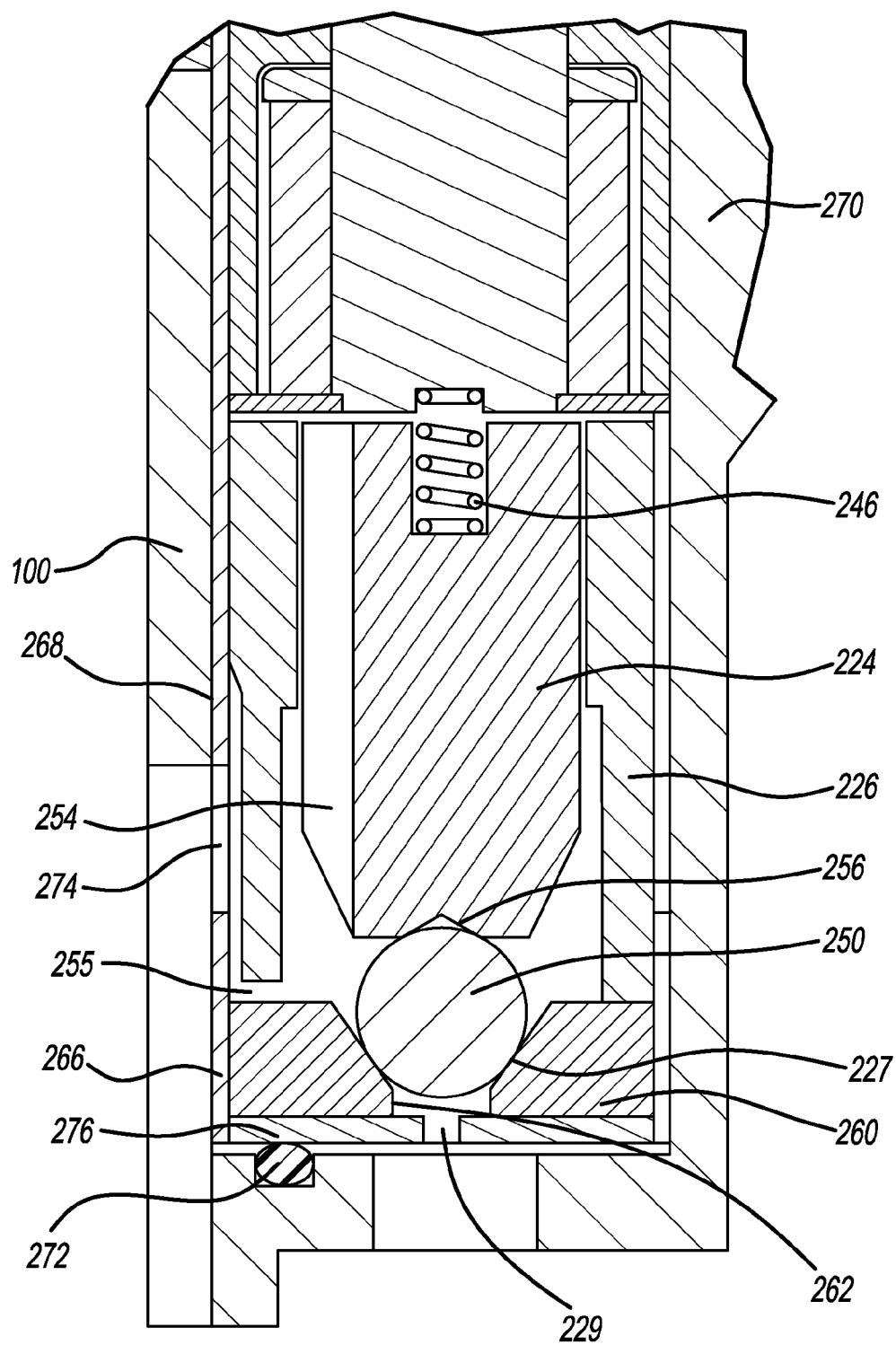
FIGS. 6-9 are enlarged views in cross-section of alternate two-position valve assemblies having a ball valve element in the rod guide assembly from the shock absorber illustrated in FIG. 2.

FIG. 5 represents an enlarged view in cross-section of an alternate two-position valve assembly 270 in the rod-guide assembly from the shock absorber illustrated in FIG. 2. The valve assembly 270 has a spool 224 which moves in relation to an alternate sleeve 226 to engage a deformable valve seat 227. The spool 224 has an upper section 234 which is annularly supported by a cylindrical portion 236 of the sleeve 226. The spool 224 further has a lower region 238 separated by a radial groove 240. The radial groove 240 functions to allow fluid flow to axially stabilize the spool 224 within the sleeve 226.

The lower region 238 defines a conical bearing surface 242 which engages an edge 244 of an aperture 248 defined in the deformable valve seat 227. The spool 224 is biased toward the deformable valve seat 227 by a biasing spring 246. As described above, the application of current to the biasing coil pulls the conical bearing surface 242 away from the deformable valve seat 227. Flow of fluid can then occur through a metering orifice 229.

FIGS. 6-9 represent enlarged views in cross-section of alternate two-position valve assemblies 270 having a ball valve element 250 according to the present teachings. Each alternate digital valve 270 has a metering orifice 229 axially aligned with a centerline of a translatable spool 224. The spool 224 is radially supported by a sleeve 226 which defines an output orifice 255. The ball valve element 250 is disposed between a valve seat 227 and the spool 224. The spool 224 can be a monolithic magnetically reactive structure defining an axial flow path 254 which is configured to allow fluid within the valve to axial balance forces about the spool 224. Additionally, the spool 224 can define a conical ball element support member 256. The valve seat 227 can be a deformable surface defined within a bearing puck 260. The bearing puck 260 can define a through passage 262 axially aligned with the metering orifice 229, the spool 224 and the biasing spring 246. The digital valve assembly 270 can be in the form of a cartridge 266 having an exterior body 268 which has a bearing surface 276 which engages a sealing gasket 272 to seal the aperture 100. The exterior body 268 can define an aperture 274 which fluidly couples the digital valve 270 to the reservoir chamber 50.

Figure 7:
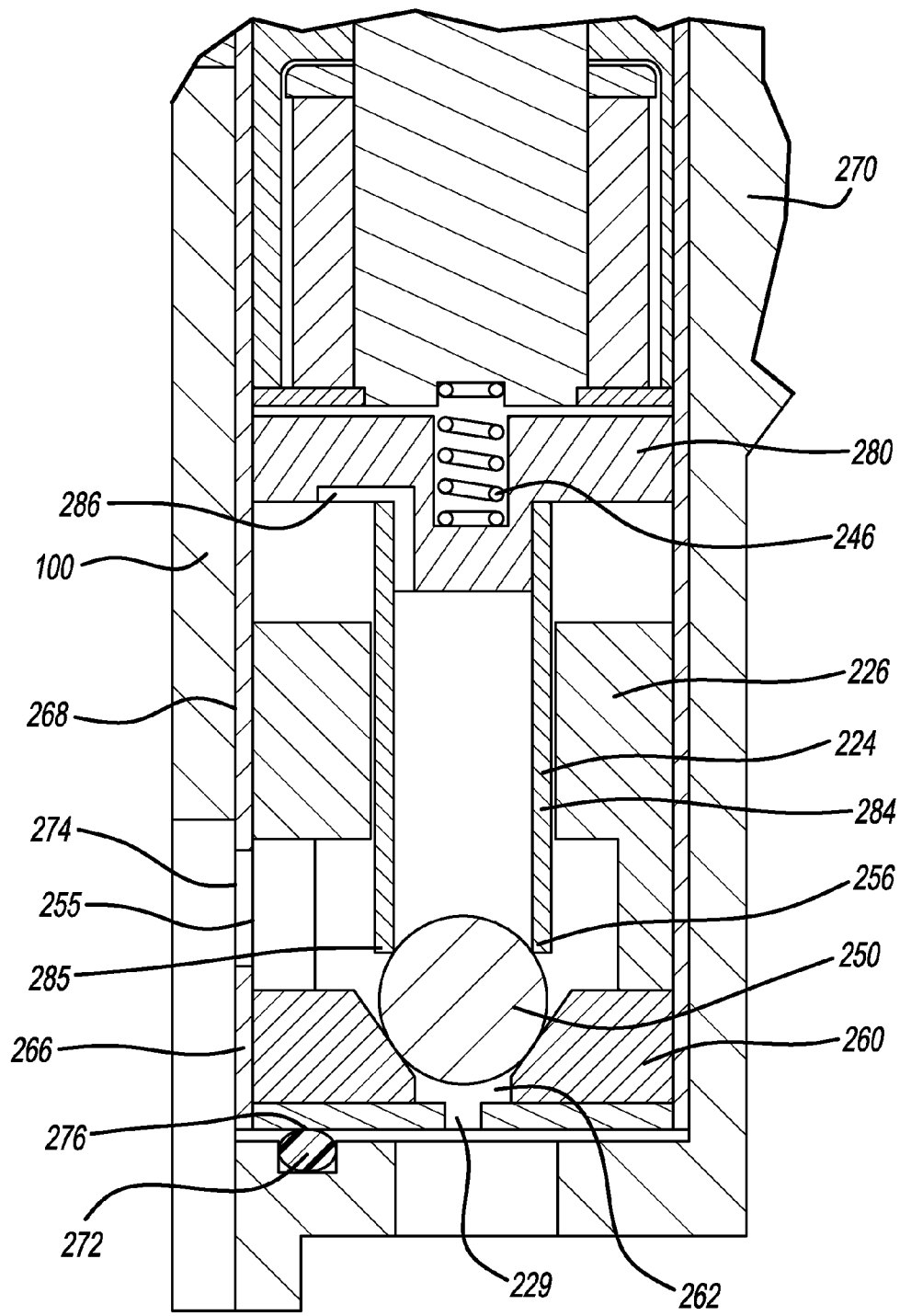
Figure 8:
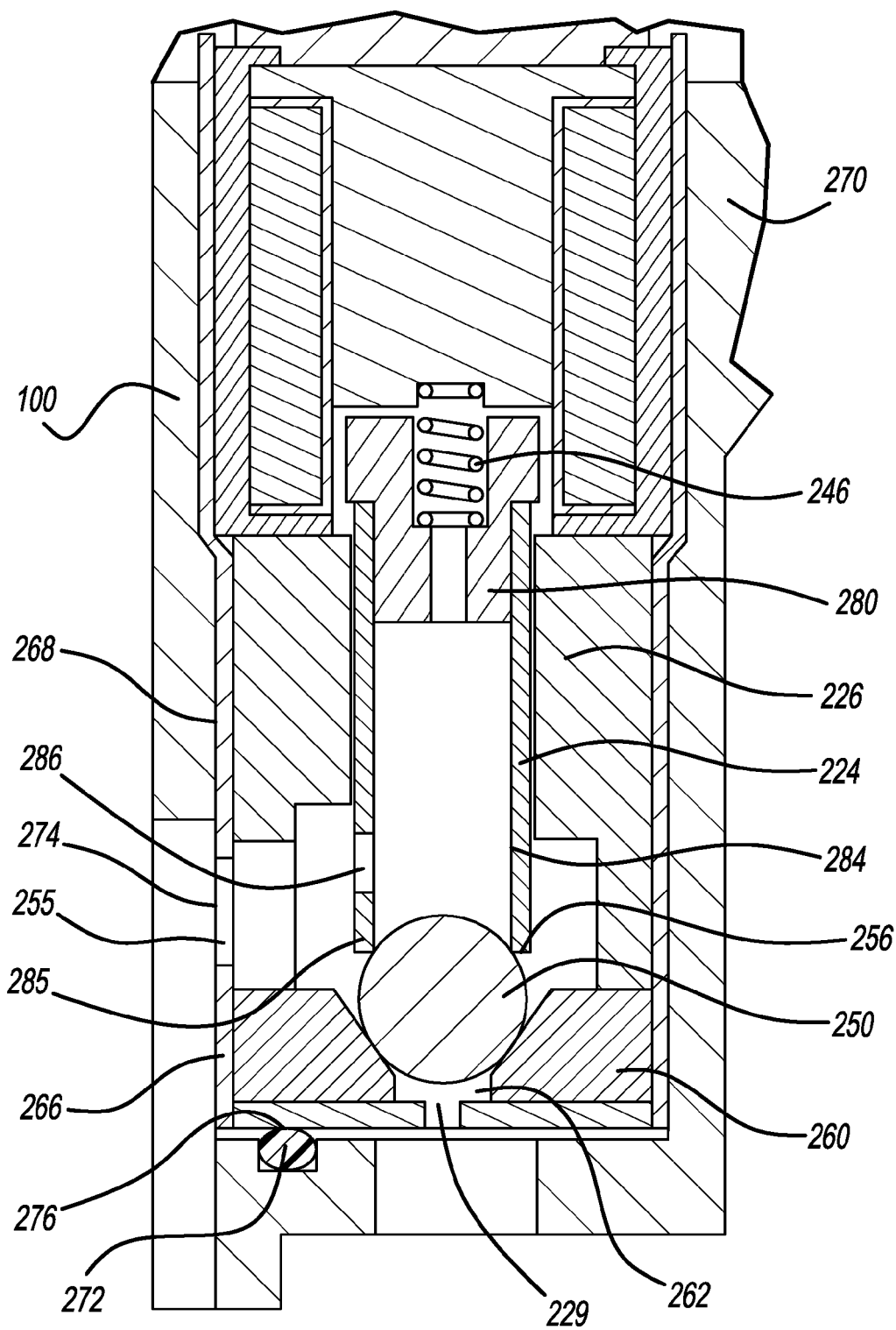

As shown in FIGS. 7 and 8, the spool 224 can be formed of several pieces joined together to minimize machining. The first member 280 is a magnetically reactive base 282 which functions to apply forces to the generally hollow force applying member 284 in response to a magnetic field generated by the coil. The generally hollow force applying member 284 can be a hollow tube having a first circular end 285 which engages the ball valve element 250. The hollow force applying member 284 and magnetically active base 282 can define through passages 286 which allow fluid flow therethrough to balance pressures within the digital valve 270, and maintain axial stability.

Figure 9:
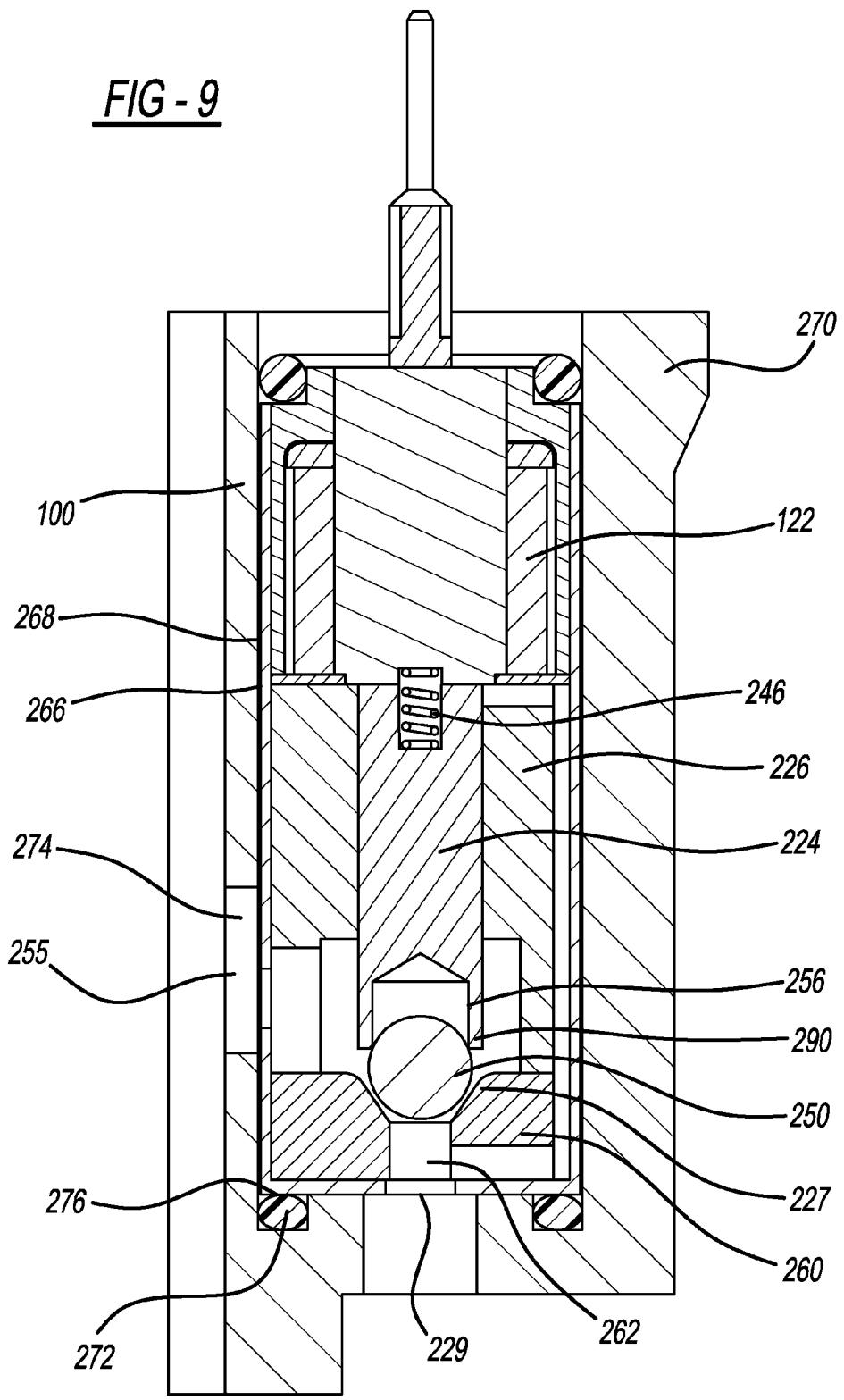

FIG. 9 depicts an alternate digital valve assembly 270 in an open configuration. In this configuration, current is applied to the coil assembly 122 which pulls the spool 224 toward the coil assembly 122 against the force generated by the biasing spring 246. Fluid flow through the metering orifice 229 displaces the ball valve element 250 away from the conical valve seat 227. The fluid is then allowed to flow through the digital valve 270 and exit orifice into the reservoir chamber 50. A circular bearing surface 290 in the spool 224 restricts axial and radial movement of the ball valve element 250 within the digital valve assembly 70.

Figure 10:
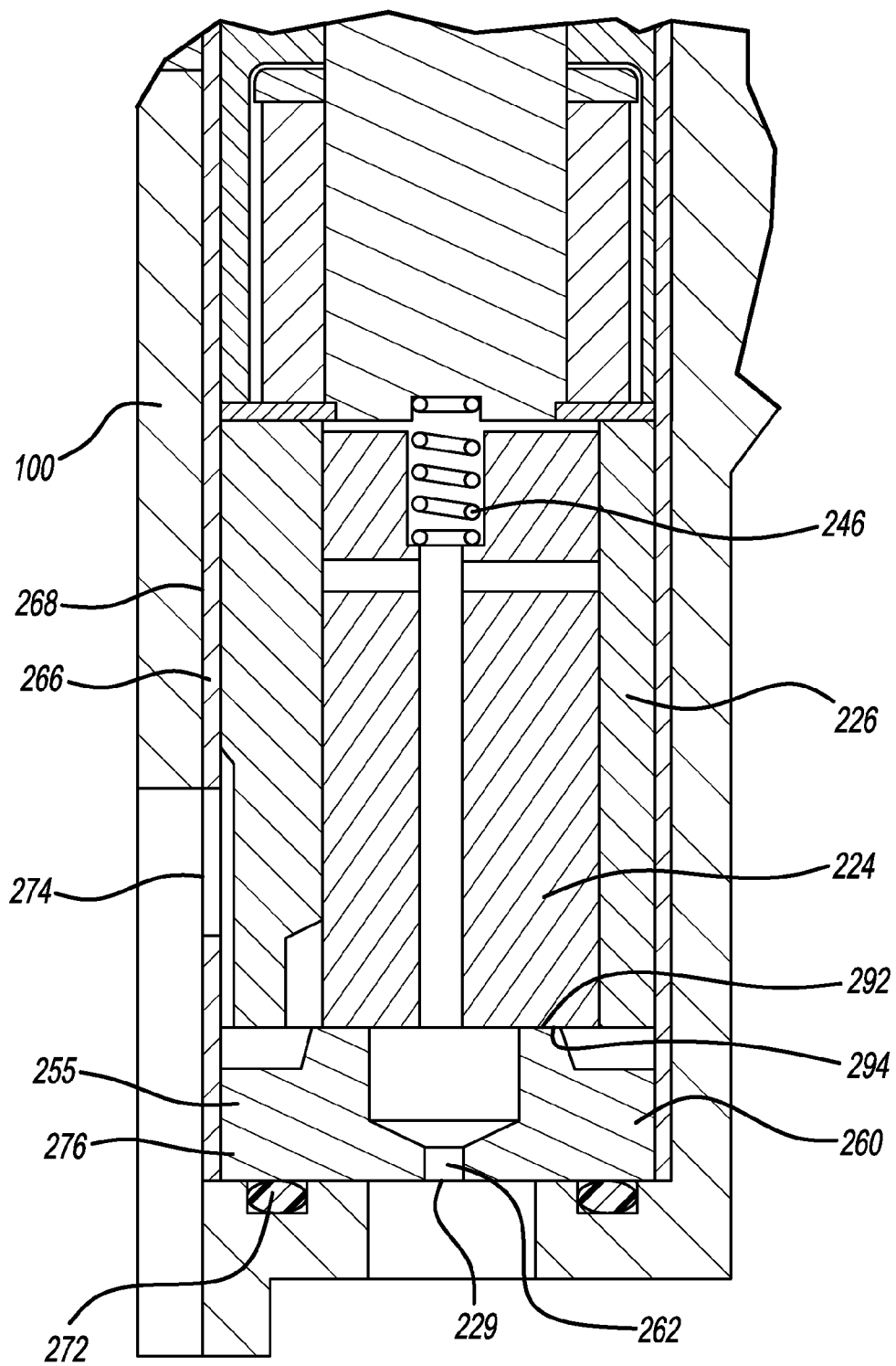
FIG. 10 is an enlarged view in cross-section of an alternate two-position valve assembly from the shock absorber illustrated in FIG. 2, the valve assembly being in a closed position.

As seen in FIG. 10, the spool 224 can have a planar bearing 292 surface which functions to sealably engage against a planar bearing surface 294 defined on a bearing puck 260. As shown, the biasing spring 246 presses the spool planar bearing surface 292 against the planar bearing surface 294 of the puck. Force balancing passages 293 are formed within both the spool 224 and sleeve 226.

Digital valve assembly 70 can be kept in the second position by continuing to supply a power signal to each coil assembly 122 or by providing means for retaining digital valve assemblies 70 in the second position and discontinuing the supply of power to coil assemblies 122. The means for retaining digital valve assembly 70 in the closed position can include mechanical means, magnetic means or other means known in the art. Alternatively, the digital valve assembly disclosed herein can have an alternate biasing spring which biases the spools in a normally open configuration.

Once in the second position, movement to the first position can be accomplished by terminating power to each coil assembly 122 or by reversing the current or reversing the polarity of the power supplied to each coil assembly 122 to overcome the retaining spring. The amount of flow through each digital valve assembly 70 has discrete settings for flow control in both the first position and the second position. While the present disclosure is described using multiple digital valve assemblies 70, it is within the scope of the disclosure to use any number of digital valve assemblies 70.

FIGS. 11-14 represent enlarged views in cross-section of alternate two-position digital valve assemblies 370 having an alternate spool 224 and sleeve 226 according to the present teachings. Each alternate digital valve 370 has a metering orifice 229 axially aligned with a centerline of the translatable spool 224. The spool 224 is radially supported by the sleeve 226 which defines an output orifice 255. It should be noted the sleeve 226 can be a separate member or integrally formed within the guide assembly. A first end 300 of the spool 224 is disposed distal to a valve seat 227 and a radially supported sidewall portion 298 of spool 224. The spool 224 can be a monolithic magnetically reactive structure defining an axial flow path 254 which is configured to allow fluid within the valve to axial balance forces about the spool 224 or may be multi-component as described above.

Figure 11:
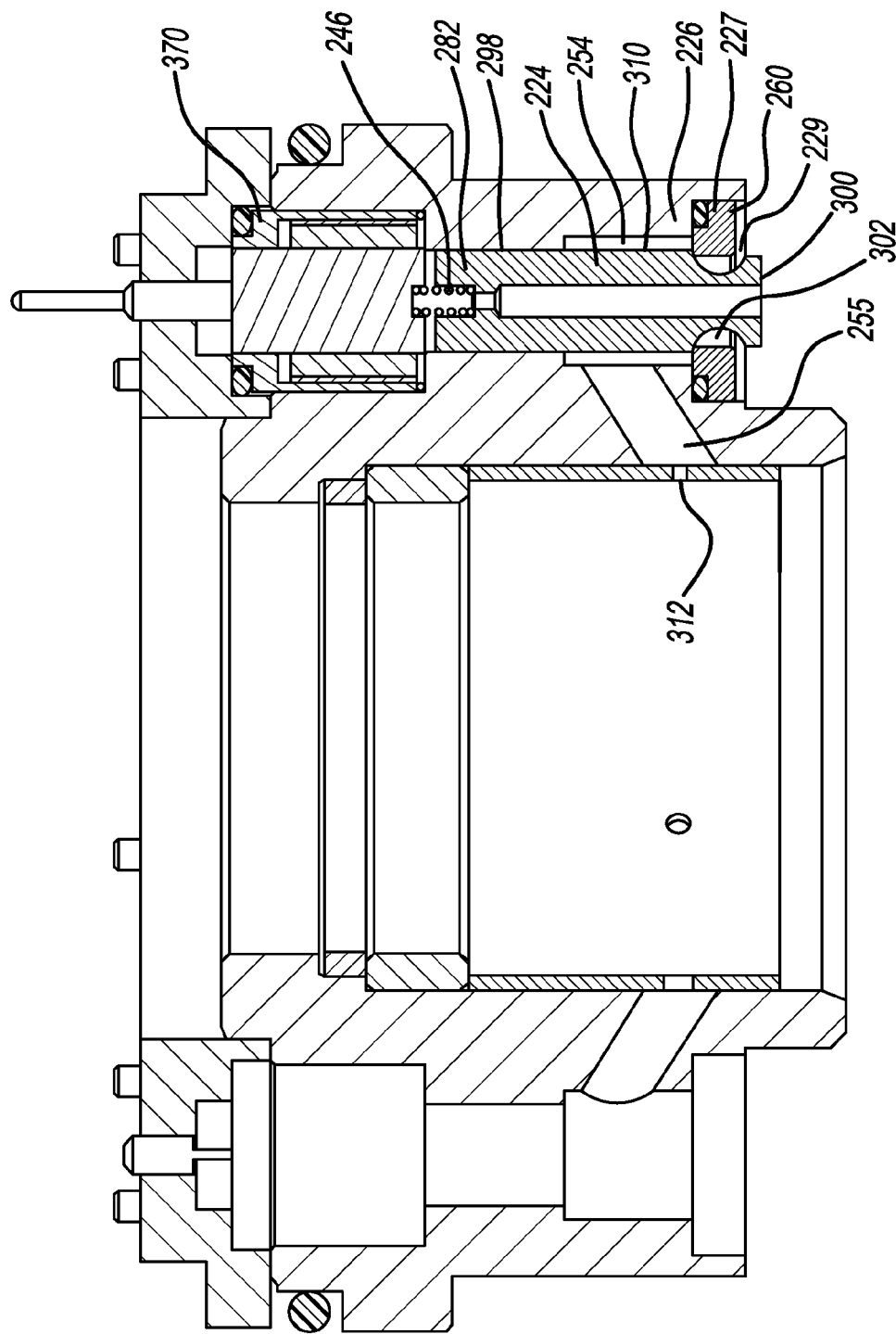
Figure 12:
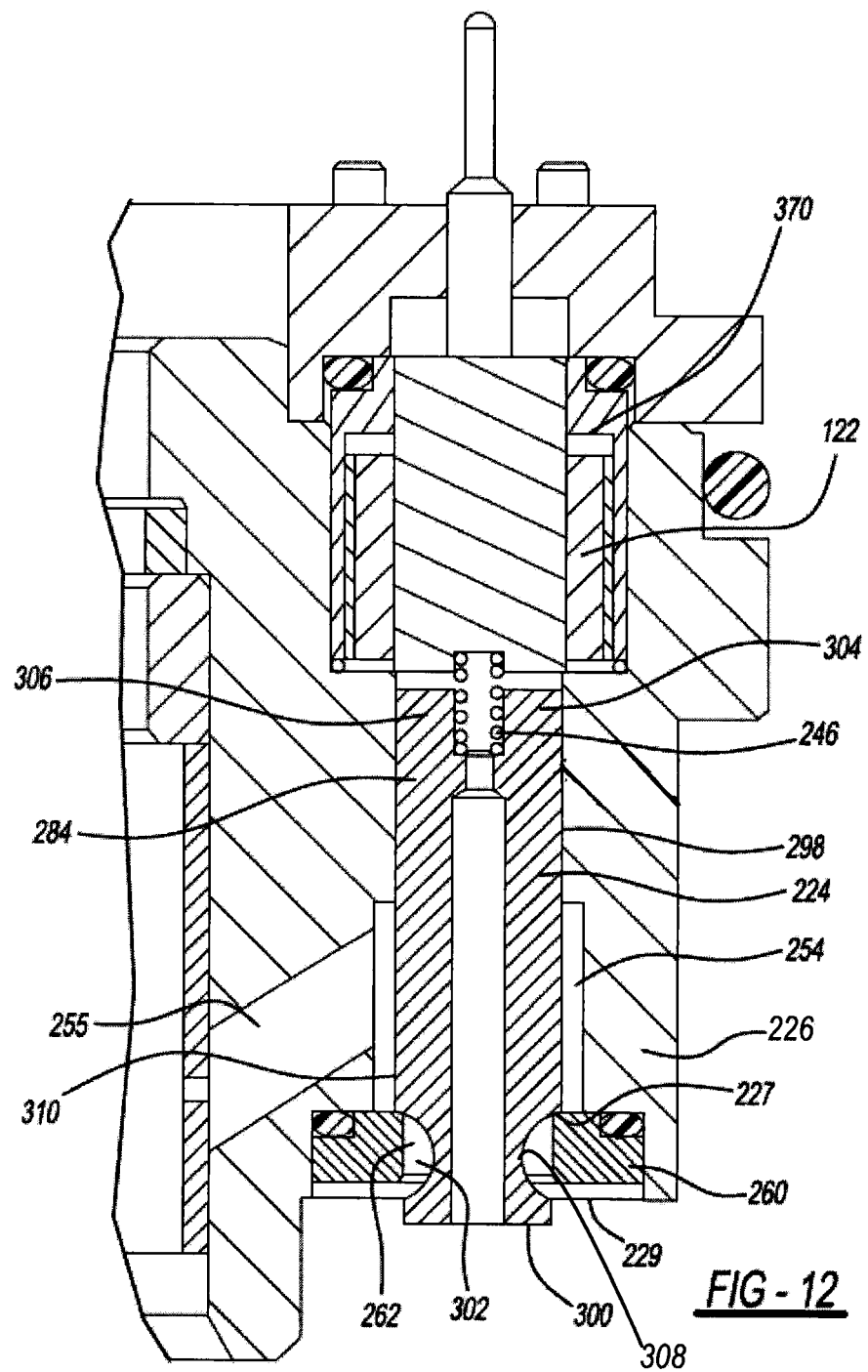

The first end 300 of the spool 224 has a segment 308 (FIG. 12) that defines a portion of a toroidal cavity 302 which functions as a fluid path when the spool is moved from a seated to an unseated position. As shown in FIGS. 11-13, when the spool 224 is biased into its normally closed or its seated position, fluid is prevented from flowing through the metering orifice 229. Alternatively, the digital valve 370 can be biased into a normally open configuration. The valve seat 227 proximate to toroidal cavity 302 can be a deformable surface defined within a bearing puck 260. The bearing puck 260 can define a through passage 262 axially aligned with the metering orifice 229, the spool 224 and the biasing spring 246. The bearing puck 260 through passage 262 can be disposed within the toroidal cavity 302 to allow engagement therewith. Alternatively, flow through the through passage 262 can meter the flow adjacent to the valve seat 227.

The spool 224 can be formed of a single monolithic machined piece having a varying diameter. A first portion 304 is a magnetically reactive base 306 which functions to apply forces to the spool 224 in response to a magnetic field generated by the coil assembly 122. The spool 224 can be a hollow tube defining the partial toroidal cavity 302 on an exterior spool surface 310 which engages the through passage 262 of the bearing puck 260. As described above, the spool 224 and magnetically reactive base 306 can define through passages which allow fluid flow therethrough to balance pressures within the digital valve 370, and maintain axial stability.

FIG. 14 depicts the alternate digital valve 370 in an open configuration. In this configuration, current is applied to the coil assembly 122 which counteracts the biasing spring 246 to pull the spool 224 toward the coil assembly 122. Fluid flow through the metering orifice 229 and toroidal cavity 302 is allowed at the circular or toroidal valve seat 227. The interaction of the toroidal cavity 302 bearing surface with the bearing surface of the circular or annular valve seat 227 defined by a sleeve protrusion 226a forms a face seal. It should be noted that, depending on design, the toroidal cavity 302 may act as a face seal on either side of the bearing puck 260. Upon actuation or deactuation of the coil assembly 122, the spool 224 is displaced, allowing fluid through the metering orifice 229 and toroidal cavity 302. The fluid is then allowed to flow through the digital valve 370 and exit orifice 312 into the reservoir chamber 50. A bearing surface 290 in the toroidal cavity 302 of the spool 224 restricts axial movement of the spool 224. This bearing surface 290 can be flat or curved as well as complementary in shape to the shape of the bearing puck 260.

It should be understood that when multiple digital valve assemblies 70 are used, the total flow area through the plurality of digital valve assemblies 70 can be set at a specific number of total flow areas depending on the position of each individual digital valve assembly 70. The specific number of total flow areas can be defined as being $2^n$ flow areas where n is the number of digital valve assemblies 70. For example, if using four digital valve assemblies 70, the number of total flow areas available would be $2^4$ or sixteen (16) flow areas. Further, the digital valve assemblies are useable both in the lower and upper guide assemblies, piston rod assemblies and/or base valve assemblies.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A shock absorber having a rod guide assembly for housing at least one digital valve assembly, the shock absorber comprising:
    a pressure tube defining upper and lower working chambers;
    a reserve tube disposed around the pressure tube;
    a reservoir chamber being defined between the pressure tube and the reserve tube;
    a guide member disposed in the rod guide assembly and forming a sleeve, and having an inlet in communication with one of the upper working chamber and the reservoir chamber, defined by the shock absorber and an outlet in communication with the other of the upper working chamber and the reservoir chamber, one of the inlet and the outlet being formed adjacent a distal end of the sleeve to open directly into the reservoir chamber;
    a digital valve assembly having a spool movably disposed within the guide member between first and second positions, the spool movable between the first position, where the spool and the guide member form a face seal, and the second position to establish a flow path from the one of the upper working chamber and the reservoir chamber into the digital valve assembly;

the spool having a side face having a toroidal groove formed with an annular surface facing toward the sleeve, an edge of the toroidal groove forming a seal with the guide member when the spool is in the first position, and wherein the toroidal groove helps to form a portion of a flow path around the spool when the spool is moved into the second position;

a coil assembly disposed adjacent the spool configured to make the spool move between the first and second positions.

2. The shock absorber according to claim 1, wherein the shock absorber further comprises a second valve assembly disposed between the lower working chamber and the reservoir chamber.

3. A shock absorber having a rod guide assembly for housing at least one digital valve assembly, the digital valve assembly comprising:

a guide member disposed in the rod guide assembly and in fluid communication with an upper working chamber and a reservoir chamber defined by the shock absorber;

the guide member further forming a sleeve;

a digital valve assembly disposed within the guide member, the sleeve defining an inlet flow path in communication with one of the upper and reservoir chambers and an outlet in communication with the other of the upper and reservoir chambers, at least one of the inlet and the outlet formed at a distal end of the sleeve and opening directly into the reservoir chamber;

a spool having a toroidal groove with an annular surface on a sidewall bearing surface thereof, and being movably disposed within the sleeve, the annular surface of the spool facing toward the sleeve, and the spool being movable from a first position abutting a surface adjacent the inlet flow path so as to form a face seal and a second position to establish a flow path from the one of the upper and reservoir chambers into the digital valve assembly using the toroidal groove as part of the flow path; and a coil assembly disposed adjacent the spool for moving the spool between the first and second positions.

4. The shock absorber according to claim 3, wherein the sleeve has a first protrusion defining a first metering surface and wherein the sidewall bearing surface is configured to move in relation to the first metering surface to form the face seal.

5. The shock absorber according to claim 4, wherein the toroidal cavity has the annular surface defined about the first protrusion.

6. The shock absorber according to claim 4, wherein the spool moves in relation to the sleeve from the first position to the second position in response to a signal sent to the coil assembly, and wherein travel of the spool with respect to the sleeve is limited by interaction of the first surface with the first metering surface.

7. A shock absorber having a rod guide assembly for housing at least one digital valve assembly, the digital valve assembly comprising:

a guide member disposed in the rod guide assembly and in fluid communication with an upper working chamber and a reservoir chamber defined by the shock absorber;

the guide member forming a sleeve;

a digital valve assembly disposed within the sleeve, the sleeve defining an inlet flow path in communication with one of the upper and reservoir chambers and an outlet in communication with the other of the upper and reservoir chambers, the sleeve defining an annular protrusion having an annular protrusion bearing surface, and one of the inlet and the outlet opening directly into the reservoir chamber;

a spool, defining a portion of a toroidal cavity having an annular toroidal bearing surface facing toward the sleeve, the toroidal cavity opening on a sidewall portion of the spool at a distal end of the spool and extending around a full circumference of the distal end of the spool, the spool being movably disposed within the sleeve and movable from a first position abutting the annular protrusion bearing surface so as to form a face seal and a second position to establish a flow path from the one of the upper and the reservoir chambers into the digital valve assembly through the toroidal cavity, and the spool projecting partially into the reservoir chamber when the spool is moved into the second position; and a coil assembly disposed adjacent the spool for moving the spool between the first and second positions.

8. The shock absorber according to claim 7, wherein the annular toroidal bearing surface of the spool overlaps the annular protrusion of the sleeve, the annular toroidal bearing surface engaging the annular protrusion bearing surface when the spool is at the first position.

* * * * *